US008878906B2

United States Patent
Shotton et al.

(10) Patent No.: US 8,878,906 B2
(45) Date of Patent: Nov. 4, 2014

(54) INVARIANT FEATURES FOR COMPUTER VISION

(71) Applicants: Jamie D. J. Shotton, Cambridge (GB); Mark J. Finocchio, Redmond, WA (US); Richard E. Moore, Redmond, WA (US); Alexandru O. Balan, Redmond, WA (US); Kyungsuk David Lee, Redmond, WA (US)

(72) Inventors: Jamie D. J. Shotton, Cambridge (GB); Mark J. Finocchio, Redmond, WA (US); Richard E. Moore, Redmond, WA (US); Alexandru O. Balan, Redmond, WA (US); Kyungsuk David Lee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 31 days.

(21) Appl. No.: 13/688,120

(22) Filed: Nov. 28, 2012

(65) Prior Publication Data

US 2014/0002607 A1 Jan. 2, 2014

Related U.S. Application Data

(63) Continuation of application No. 13/155,293, filed on Jun. 7, 2011, now abandoned.

(51) Int. Cl.
*G06K 9/62* (2006.01)
*H04N 13/02* (2006.01)
*G06K 9/00* (2006.01)
*G06F 3/01* (2006.01)

(52) U.S. Cl.
CPC .......... *G06K 9/6227* (2013.01); *G06K 9/00375* (2013.01); *G06F 3/017* (2013.01); *G06K 9/00201* (2013.01); *H04N 13/0203* (2013.01)

USPC ............. 348/46; 382/103; 382/154; 382/181; 382/190; 382/195; 382/209; 382/224

(58) Field of Classification Search
USPC ............ 348/46; 382/154, 103, 181, 190, 195, 382/209, 224
See application file for complete search history.

(56) References Cited

U.S. PATENT DOCUMENTS

| | | | |
|---|---|---|---|
| 6,711,293 B1 | 3/2004 | Lowe | |
| 7,133,572 B2 | 11/2006 | Neubauer et al. | |
| 7,274,832 B2 | 9/2007 | Nicponski | |
| 7,689,033 B2 | 3/2010 | Xiao et al. | |

(Continued)

OTHER PUBLICATIONS

Office Action Dated Jul. 1, 2013, U.S. Appl. No. 13/155,293, filed Jun. 7, 2011, 18 pages.

(Continued)

*Primary Examiner* — Christopher S Kelley
*Assistant Examiner* — Zhihan Zhou
(74) *Attorney, Agent, or Firm* — Micah Goldsmith; Leonard Smith; Micky Minhas

(57) ABSTRACT

Technology is described for determining and using invariant features for computer vision. A local orientation may be determined for each depth pixel in a subset of the depth pixels in a depth map. The local orientation may an in-plane orientation, an out-out-plane orientation or both. A local coordinate system is determined for each of the depth pixels in the subset based on the local orientation of the corresponding depth pixel. A feature region is defined relative to the local coordinate system for each of the depth pixels in the subset. The feature region for each of the depth pixels in the subset is transformed from the local coordinate system to an image coordinate system of the depth map. The transformed feature regions are used to process the depth map.

18 Claims, 17 Drawing Sheets

(56) References Cited

U.S. PATENT DOCUMENTS

| | | | |
|---|---|---|---|
| 2006/0285755 A1* | 12/2006 | Hager et al. | 382/224 |
| 2009/0016604 A1* | 1/2009 | Ke et al. | 382/176 |
| 2009/0157649 A1* | 6/2009 | Papadakis et al. | 707/5 |
| 2009/0185746 A1* | 7/2009 | Mian et al. | 382/209 |
| 2010/0246915 A1* | 9/2010 | Yamakoshi et al. | 382/131 |
| 2010/0278384 A1 | 11/2010 | Shotton et al. | |
| 2011/0025689 A1 | 2/2011 | Perez et al. | |
| 2012/0219188 A1* | 8/2012 | Kurz et al. | 382/103 |

OTHER PUBLICATIONS

Lowe, David G., "Distinctive Image Features from Scale-Invariant Keypoints", International Journal of Computer Vision, vol. 60, No. 2, Nov. 2004, 28 pages.

Shotton, et al., "Real-Time Human Pose Recognition in Parts from Single Depth Images", Online, [retrieved on Mar. 29, 2011] Retrieved from the Internet: <URL:http://research.microsoft.com/pubs/145347/BodyPartRecognition. pdf>, 8 pages.

Yokono, et al., "Rotation Invariant Object Recognition from One Training Example", AI Memo, CBCL Memo 238, MIT Computer Science and Artificial Intelligence Laboratory, Apr. 27, 2004, Cambridge, MA, USA, 16 pages.

Chen, et al., "Rotation Invariant Pattern Recognition Using Ridgelets, Wavelet Cycle-Spinning and Fourier Features", Pattern Recognition Society, vol. 38, Issue 12, Dec. 2005, Elsevier Science Inc., New York, NY, USA, pp. 2314-2322.

Takacs, et al., "Unified Real-Time Tracking and Recognition with Rotation-Invariant Fast Features", IEEE Conference on Computer Vision and Pattern Recognition (CVPR), Jun. 13-18, 2010, San Francisco, CA, USA, pp. 934-941.

Mikolajczyk, et al., "A Performance Evaluation of Local Descriptors", IEEE Transactions on Pattern Analysis and Machine Intelligence, vol. 27, No. 10, Oct. 2005, IEEE Computer Society, pp. 1615-1630.

Zhang, Zhengyou, "A Flexible New Technique for Camera Calibration", IEEE Transaction on Pattern Analysis and Machine Intelligence, vol. 22, Issue 11, Nov. 2000, IEEE Computer Society, Washington, DC, USA, 22 pages.

* cited by examiner

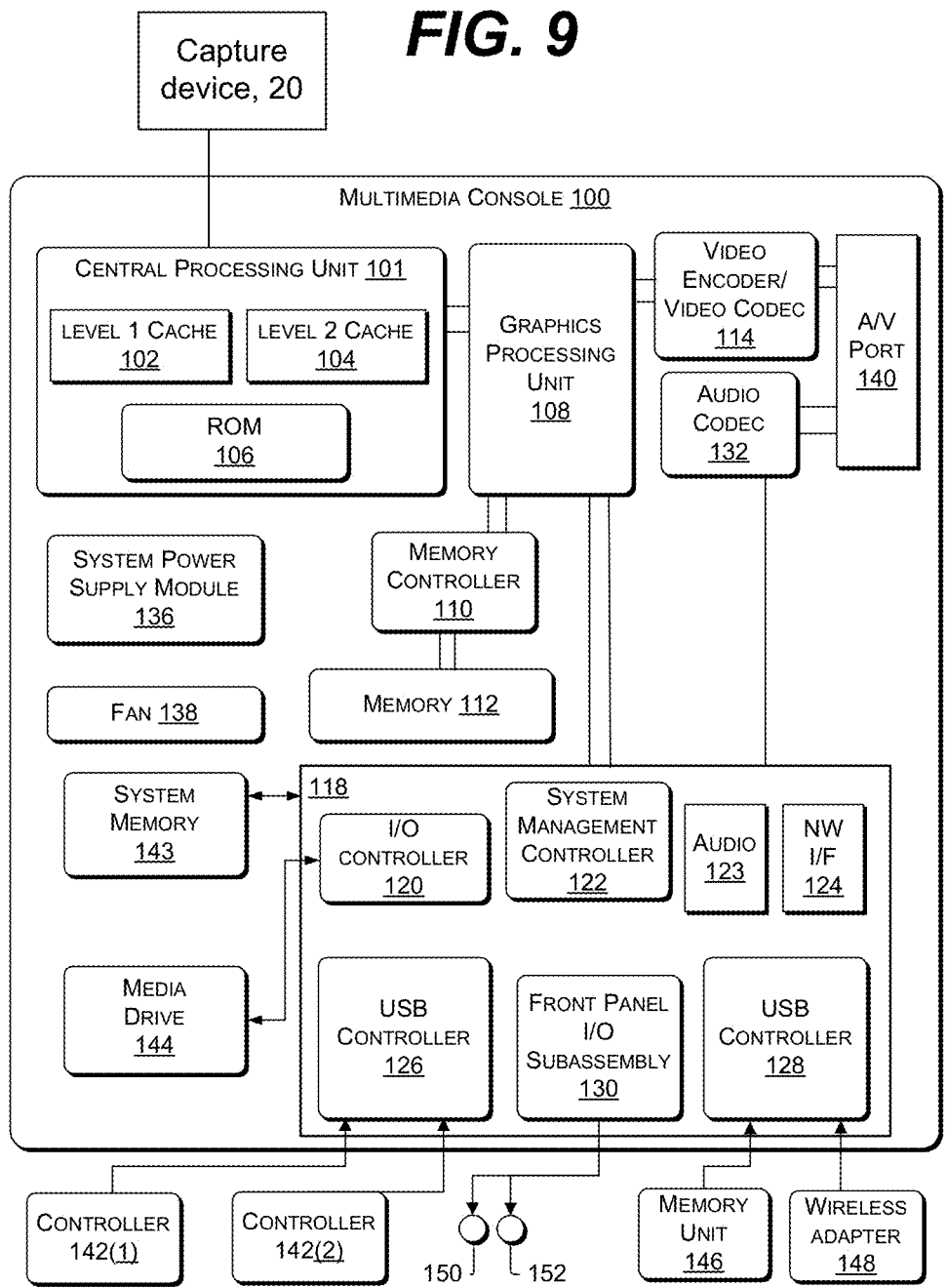

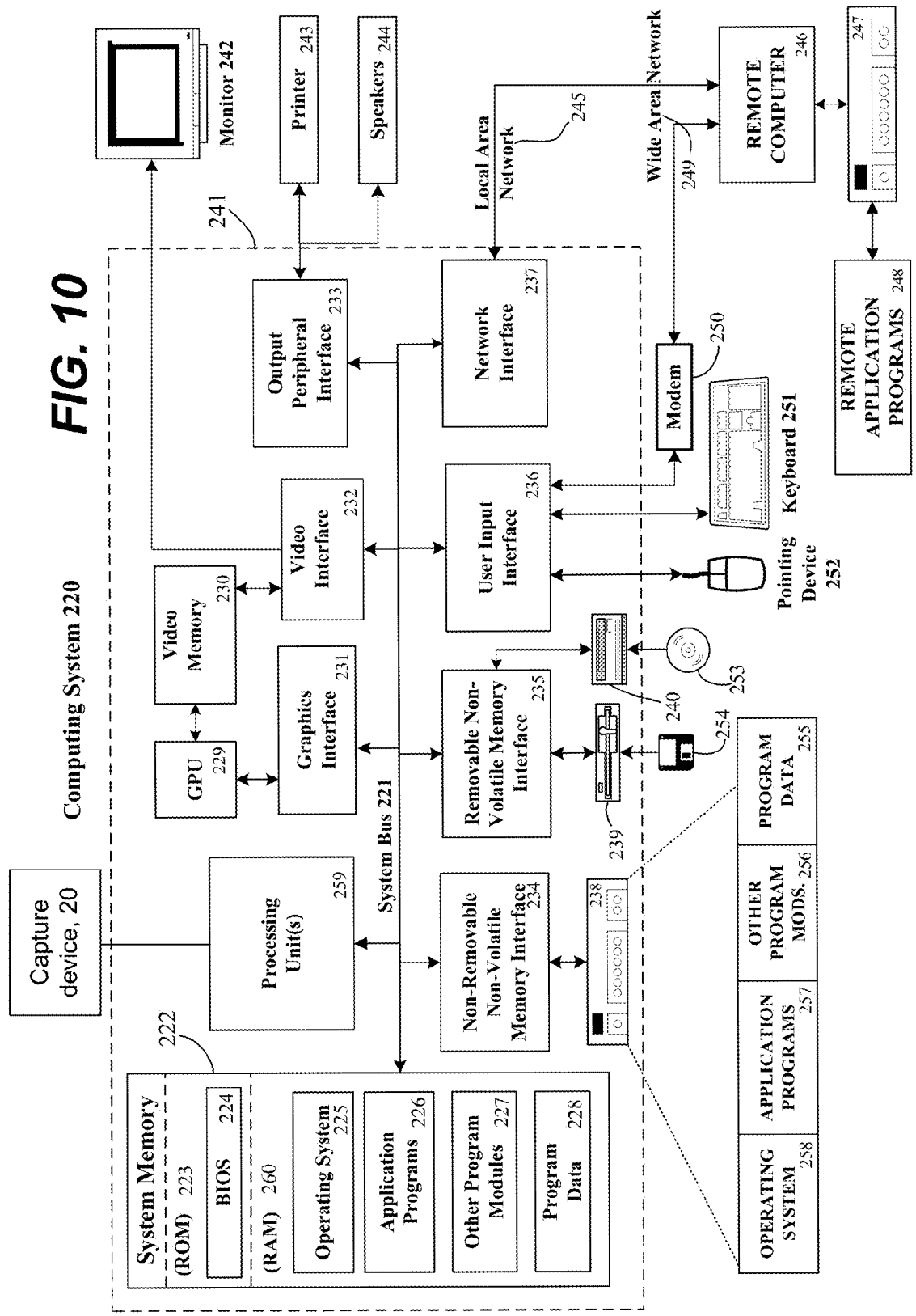

US 8,878,906 B2

INVARIANT FEATURES FOR COMPUTER VISION

CLAIM OF PRIORITY

This application is a continuation application of co-pending U.S. patent application Ser. No. 13/155,293, entitled "INVARIANT FEATURES FOR COMPUTER VISION," by Shotton et al., filed Jun. 7, 2011, incorporated herein by reference in its entirety.

BACKGROUND

Computer games and multimedia applications have begun employing cameras and software gesture recognition engines to provide a human computer interface ("HCI"). With HCI, user body parts and movements are detected, interpreted and used to control game characters or other aspects of an application.

One technique for identifying objects such as body parts is computer vision. Some computer vision techniques develop a "classifier" by analyzing one or more example images. As the name implies, an example image is an image that contains one or more examples of the objects that are to be identified. Often, many example images need to be analyzed to adequately develop or "train" the classifier to recognize the object. In some techniques, features are extracted from the example image. Those features which work best to identify the object may be kept for use at run time.

The classifier may later be used during "run time" to identify objects such as body parts. For example, a computer vision system may capture an image in real time, such as a user interacting with a computer system. The computer vision system uses the classifier to identifier objects, such as the hand of the user. In some techniques, the classifier analyzes features that are extracted from the image in order to identify the object.

One difficulty with computer vision is that during run time objects such as body parts could have many possible orientations relative to the camera. For example, the user might have their hand rotated at virtually any angle relative to the camera. Note that for some techniques the features that are extracted are not invariant to the possible orientations of the object. For example, the features may not be invariant to possible rotations of a user's hand.

To account for the multitude of possible rotations of the object (e.g., hand), the example images that are used to build the classifier could theoretically contain many different rotations. For example, example images that show a multitude of possible rotations of a hand could be used to train the classifier. At one extreme, if the example images do not contain enough possible rotations, then the accuracy of the classifier may be poor. At the other extreme, containing a multitude of rotations in the example images may lead to an overly complex classifier, which may result in slow processing speed and high memory usage at run-time For example, the features that work well for one rotation may not work well for another rotation. This may result in the classifier needing to be able to account for all of the possible rotations.

SUMMARY

Technology is described for determining and using features that may be used to identify objects using computer vision. The features may be invariant to various orientations of the object to be identified relative to the camera. For example, the features may be rotation invariant. Therefore, fewer example images may be needed to train the classifier to recognize the object. Consequently, the complexity of the classifier may be simplified without sacrificing accuracy during run time. Techniques may be used to identify objects at run time using computer vision with the use of rotation invariant features.

One embodiment includes a method of processing a depth map that includes the following. A depth map that includes depth pixels is accessed. The depth map is associated with an image coordinate system having a plane. A local orientation for each depth pixel in a subset of the depth pixels is estimated. The local orientation is one or both of an in-plane orientation and an out-out-plane orientation relative to the plane of the image coordinate system. A local coordinate system for each of the depth pixels in the subset is determined. Each local coordinate system is based on the local orientation of the corresponding depth pixel. A feature region is defined relative to the local coordinate system for each of the depth pixels in the subset. The feature region for each of the depth pixels in the subset is transformed from the local coordinate system to the image coordinate system. The transformed feature regions are used to process the depth map. The depth map may be processed at either training time or run time.

One embodiment includes system comprising a depth camera and logic coupled to the depth camera. The depth camera is for generating depth maps that includes a plurality of depth pixels. Each pixel has a depth value, and each depth map is associated with a 2D image coordinate system. The logic is operable to access a depth map from the depth camera; the depth map is associated with an image coordinate system having a plane. The logic is operable to estimate a local orientation for each depth pixel in a subset of the depth pixels. The local orientation includes one or both of an in-plane orientation that is in the plane of the 2D image coordinate system and an out-out-plane orientation that is out-of-the plane of the 2D image coordinate system. The logic is operable to define a local 3D coordinate system for each of the depth pixels in the subset, each local 3D coordinate system is based on the local orientation of the corresponding depth pixel. The logic is operable to define a feature region relative to the local coordinate system for each of the depth pixels in the subset. The logic is operable to transform the feature region for each of the depth pixels in the subset from the local 3D coordinate system to the 2D image coordinate system. The logic is operable to identify an object in the depth map based on the transformed feature regions.

One embodiment is a computer readable storage medium having instructions stored thereon which, when executed on a processor, cause the processor to perform the following steps. A depth map that includes an array of depth pixels is accessed. Each depth pixel has a depth value, and the depth map is associated with a 2D image coordinate system. A local orientation for each depth pixel in a subset of the depth pixels is determined. The local orientation includes in-plane orientation that is in the plane of the 2D image coordinate system and an out-out-plane orientation that is out-of-the plane of the 2D image coordinate system. A 3D model for the depth map is determined. The model includes 3D points that are based on the depth pixels, each of the points has a corresponding depth pixel. A local 3D coordinate system is defined for each of the plurality of points, each local 3D coordinate system is based on the position and local orientation of the corresponding depth pixel. Feature test points are determined relative to the local coordinate system for each of the points. The feature test points are transformed from the local 3D coordinate system to the 2D image coordinate system for each of the feature test points. An object is identified in the depth map based on the transformed feature test points.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 9 illustrates an example of a computing environment in accordance with embodiments of the present disclosure.

FIG. 10 illustrates an example of a computing environment in accordance with embodiments of the present disclosure.

DETAILED DESCRIPTION

Technology is described for developing and using features that may be used to automatically identify objects using computer vision. The features may be rotation invariant. The features may also be translation invariant and/or scale invariant. In one embodiment, the features are in-plane rotation invariant. In one embodiment, the features are out-of-plane rotation invariant. In one embodiment, the features are both in-plane and out-of-plane rotation invariant. By being invariant to transformation such as rotation, the training data requirements and the memory and processing requirements of the classifier can be reduced without adversely affecting test accuracy.

In some embodiments, the invariant features are used in a motion capture system having a capture device. For example, rotation invariant features may be used to identify a user's hand such that the hand can be tracked. One example application is to determine gestures made by the user to allow the user to interact with the system. Therefore, an example motion capture system will be described. However, it will be understood that technology described herein is not limited to a motion capture system.

Figure 1:
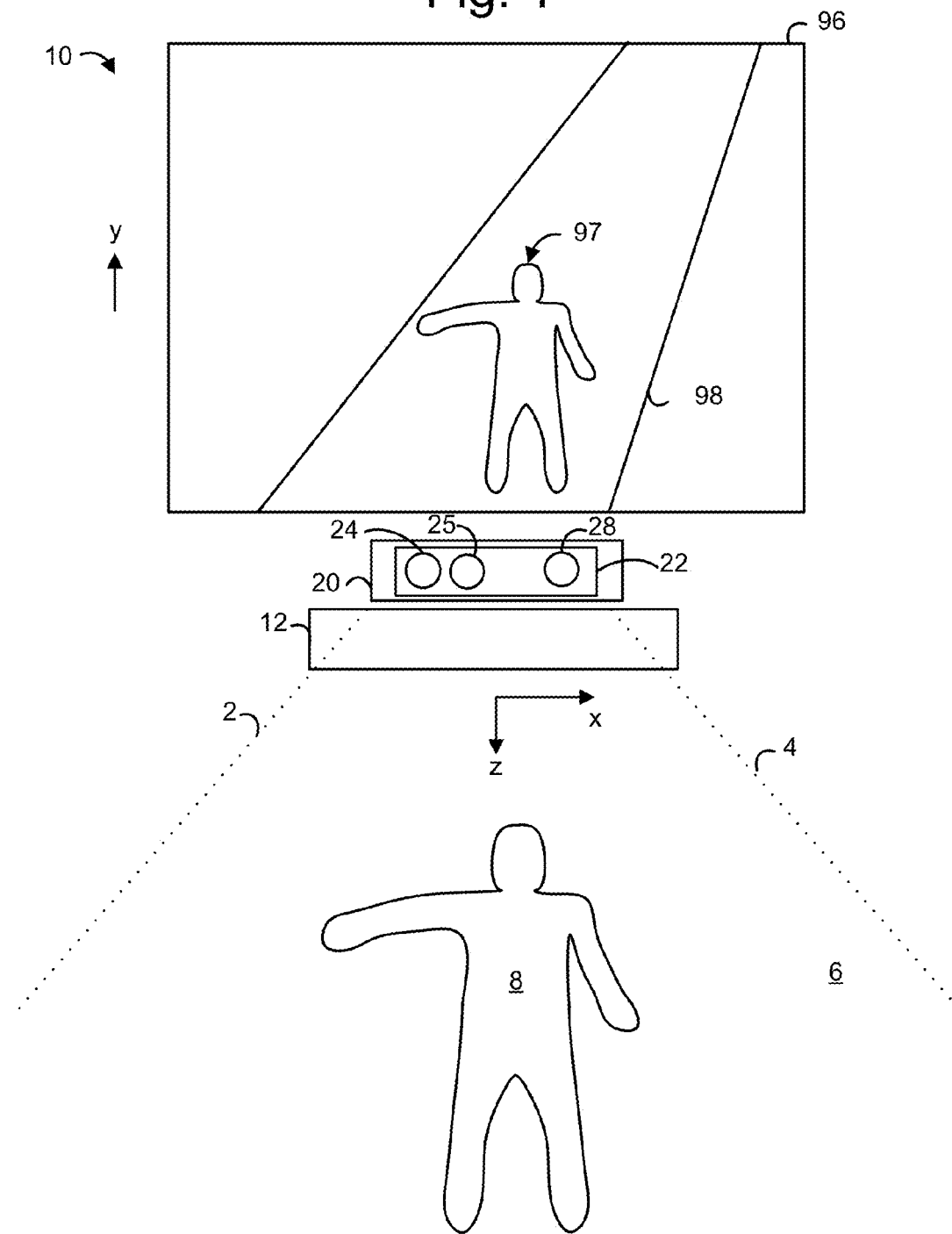
FIG. 1 depicts one embodiment of a target detection and tracking system tracking a user.

FIG. 1 depicts an example of a motion capture system 10 in which a person interacts with an application. The motion capture system 10 includes a display 96, a capture device 20, and a computing environment or apparatus 12. The capture device 20 may include an image camera component 22 having a light transmitter 24, light receiver 25, and a red-green-blue (RGB) camera 28. In one embodiment, the light transmitter 24 emits a collimated light beam. Examples of collimated light include, but are not limited to, Infrared (IR) and laser. In one embodiment, the light transmitter 24 is an LED. Light that reflects off from an object 8 in the field of view is detected by the light receiver 25.

A user, also referred to as a person or player, stands in a field of view 6 of the capture device 20. Lines 2 and 4 denote a boundary of the field of view 6. In this example, the capture device 20, and computing environment 12 provide an application in which an avatar 97 on the display 96 track the movements of the object 8 (e.g., a user). For example, the avatar 97 may raise an arm when the user raises an arm. The avatar 97 is standing on a road 98 in a 3-D virtual world. A Cartesian world coordinate system may be defined which includes a z-axis which extends along the focal length of the capture device 20, e.g., horizontally, a y-axis which extends vertically, and an x-axis which extends laterally and horizontally. Note that the perspective of the drawing is modified as a simplification, as the display 96 extends vertically in the y-axis direction and the z-axis extends out from the capture device 20, perpendicular to the y-axis and the x-axis, and parallel to a ground surface on which the user stands.

Generally, the motion capture system 10 is used to recognize, analyze, and/or track an object. Invariant features (e.g., rotation invariant) that are developed in accordance to embodiments can be used in the motion capture system 10. The computing environment 12 can include a computer, a gaming system or console, or the like, as well as hardware components and/or software components to execute applications.

The capture device 20 may include a camera which is used to visually monitor one or more objects 8, such as the user, such that gestures and/or movements performed by the user may be captured, analyzed, and tracked to perform one or more controls or actions within an application, such as animating an avatar or on-screen character or selecting a menu item in a user interface (UI). A gesture may be dynamic, comprising a motion, such as mimicking throwing a ball. A gesture may be a static pose, such as holding one's forearms crossed. A gesture may also incorporate props, such as swinging a mock sword.

Some movements of the object 8 may be interpreted as controls that may correspond to actions other than controlling an avatar. For example, in one embodiment, the player may use movements to end, pause, or save a game, select a level, view high scores, communicate with a friend, and so forth. The player may use movements to select the game or other application from a main user interface, or to otherwise navigate a menu of options. Thus, a full range of motion of the object 8 may be available, used, and analyzed in any suitable manner to interact with an application.

The person can hold an object such as a prop when interacting with an application. In such embodiments, the movement of the person and the object may be used to control an application. For example, the motion of a player holding a racket may be tracked and used for controlling an on-screen racket in an application which simulates a tennis game. In another example embodiment, the motion of a player holding a toy weapon such as a plastic sword may be tracked and used for controlling a corresponding weapon in the virtual world of an application which provides a pirate ship.

The motion capture system 10 may further be used to interpret target movements as operating system and/or application controls that are outside the realm of games and other applications which are meant for entertainment and leisure. For example, virtually any controllable aspect of an operating system and/or application may be controlled by movements of the object 8.

The motion capture system 10 may be connected to an audiovisual device such as the display 96, e.g., a television, a monitor, a high-definition television (HDTV), or the like, or even a projection on a wall or other surface, that provides a visual and audio output to the user. An audio output can also be provided via a separate device. To drive the display, the computing environment 12 may include a video adapter such as a graphics card and/or an audio adapter such as a sound card that provides audiovisual signals associated with an application. The display 96 may be connected to the computing environment 12 via, for example, an S-Video cable, a coaxial cable, an HDMI cable, a DVI cable, a VGA cable, or the like.

Figure 2:
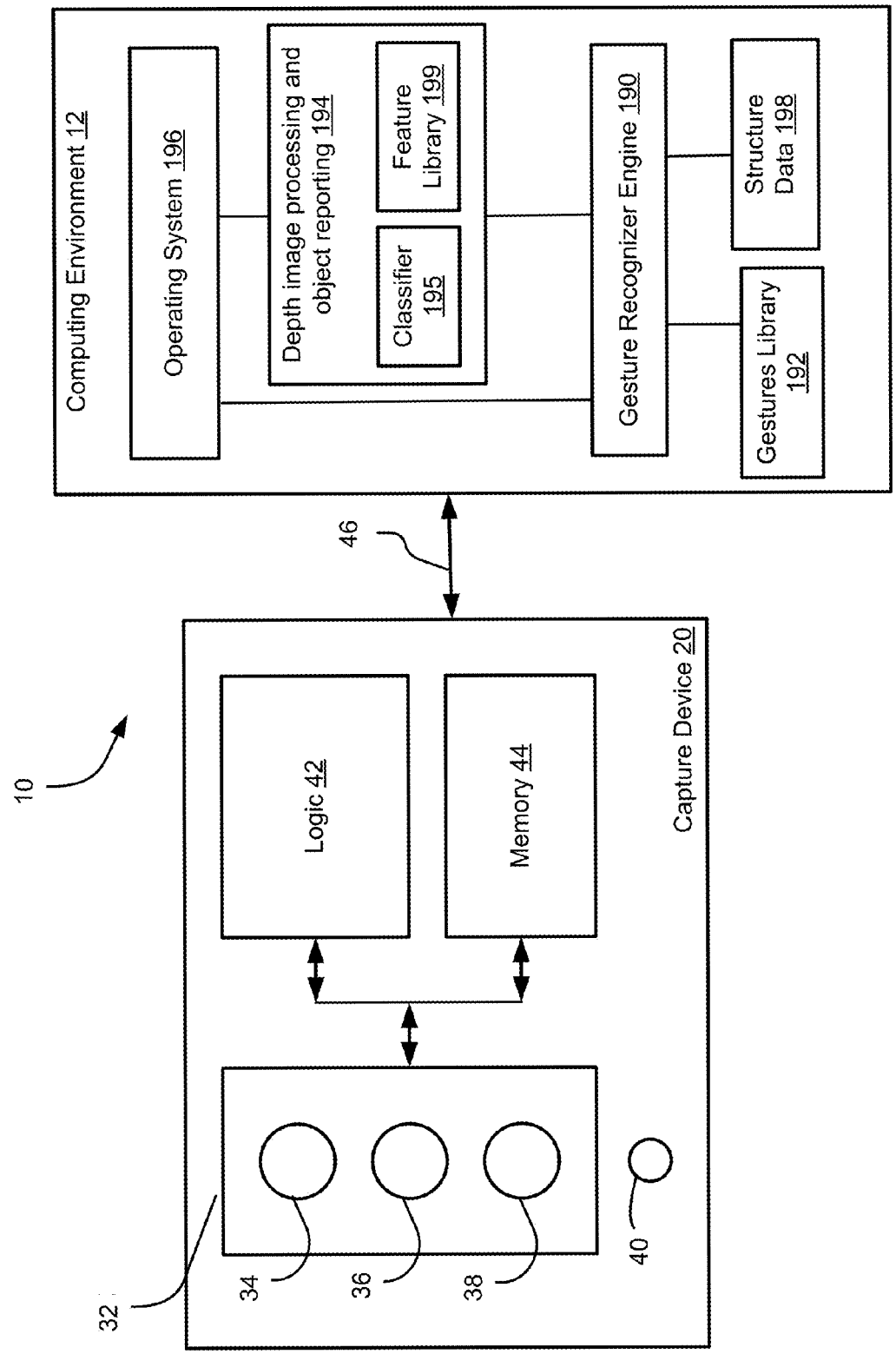
FIG. 2 depicts one embodiment of a target detection and tracking system.

FIG. 2 illustrates one embodiment of a target detection and tracking system 10 including a capture device 20 and computing environment 12 that may be used to recognize human and non-human targets in a capture area (with or without special sensing devices attached to the subjects), uniquely identify them, and track them in three dimensional space. In one embodiment, the capture device 20 may be a depth camera (or depth sensing camera) configured to capture video with depth information including a depth map that may include depth values via any suitable technique including, for example, time-of-flight, structured light, stereo image, or the like. In one embodiment, the capture device 20 may include a depth sensing image sensor. In one embodiment, the capture device 20 may organize the calculated depth information into "Z layers," or layers that may be perpendicular to a Z-axis extending from the depth camera along its line of sight.

As shown in FIG. 2, the capture device 20 may include an image camera component 32. In one embodiment, the image camera component 32 may be a depth camera that may capture a depth map of a scene. The depth map may include a two-dimensional (2-D) pixel area of the captured scene where each pixel in the 2-D pixel area may represent a depth value such as a distance in, for example, centimeters, millimeters, or the like of an object in the captured scene from the camera. The image camera component 32 may be pre-calibrated to obtain estimates of camera intrinsic parameters such as focal length, principal point, lens distortion parameters etc. Techniques for camera calibration are discussed in, Z. Zhang, "A Flexible New Technique for Camera Calibration," IEEE Transactions on Pattern Analysis and Machine Intelligence, 22(11):1330-1334, 2000, which is hereby incorporated by reference.

As shown in FIG. 2, the image camera component 32 may include an IR light component 34, a three-dimensional (3-D) camera 36, and an RGB camera 38 that may be used to capture the depth map of a capture area. For example, in time-of-flight analysis, the IR light component 34 of the capture device 20 may emit an infrared light onto the capture area and may then use sensors to detect the backscattered light from the surface of one or more targets and objects in the capture area using, for example, the 3-D camera 36 and/or the RGB camera 38. In some embodiment, capture device 20 may include an IR CMOS image sensor. In some embodiments, pulsed infrared light may be used such that the time between an outgoing light pulse and a corresponding incoming light pulse may be measured and used to determine a physical distance from the capture device 20 to a particular location on the targets or objects in the capture area. Additionally, the phase of the outgoing light wave may be compared to the phase of the incoming light wave to determine a phase shift. The phase shift may then be used to determine a physical distance from the capture device to a particular location on the targets or objects.

In one embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more targets (or objects) in the capture area, the pattern may become deformed in response. Such a deformation of the pattern may be captured by, for example, the 3-D camera 36 and/or the RGB camera 38 and analyzed to determine a physical distance from the capture device to a particular location on the targets or objects.

In some embodiments, two or more different cameras may be incorporated into an integrated capture device. For example, a depth camera and a video camera (e.g., an RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of target tracking, image capture, face recognition, high-precision tracking of fingers (or other small features), light sensing, and/or other functions.

In one embodiment, the capture device 20 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth map sensors can also be used to create a depth map.

As shown in FIG. 2, capture device 20 may include a microphone 40. The microphone 40 may include a transducer or sensor that may receive and convert sound into an electrical signal. In one embodiment, the microphone 40 may be used to reduce feedback between the capture device 20 and the computing environment 12 in the target detection and tracking system 10. Additionally, the microphone 40 may be used to receive audio signals that may also be provided by the user to control applications such as game applications, non-game applications, or the like that may be executed by the computing environment 12.

The capture device 20 may include logic 42 that is in communication with the image camera component 22. The logic 42 may include a standardized processor, a specialized processor, a microprocessor, or the like that may execute instructions. The logic 42 may also include hardware such as an ASIC, electronic circuitry, logic gates, etc. In the event that the logic 42 is a processor, the processor 42 may execute instructions that may include instructions for storing profiles, receiving the depth map, determining whether a suitable target may be included in the depth map, converting the suitable target into a skeletal representation or model of the target, or any other suitable instructions.

It is to be understood that at least some target analysis and tracking operations may be executed by processors contained within one or more capture devices. A capture device may include one or more onboard processing units configured to perform one or more target analysis and/or tracking functions. Moreover, a capture device may include firmware to facilitate updating such onboard processing logic.

As shown in FIG. 2, the capture device 20 may include a memory component 44 that may store the instructions that may be executed by the processor 42, images or frames of images captured by the 3-D camera or RGB camera, user profiles or any other suitable information, images, or the like. In one example, the memory component 44 may include random access memory (RAM), read only memory (ROM), cache, Flash memory, a hard disk, or any other suitable storage component. The memory component 44 may also be referred to as a computer storage medium. As shown in FIG. 2, the memory component 44 may be a separate component in communication with the image capture component 32 and the processor 42. In another embodiment, the memory component 44 may be integrated into the processor 42 and/or the image capture component 32. In one embodiment, some or all of the components 32, 34, 36, 38, 40, 42 and 44 of the capture device 20 illustrated in FIG. 2 are housed in a single housing.

As shown in FIG. 2, the capture device 20 may be in communication with the computing environment 12 via a communication link 46. The communication link 46 may be a wired connection including, for example, a USB connection, a Firewire connection, an Ethernet cable connection, or the like and/or a wireless connection such as a wireless 802.11b, g, a, or n connection. The computing environment 12 may provide a clock to the capture device 20 that may be used to determine when to capture, for example, a scene via the communication link 46.

In one embodiment, the capture device 20 may provide the depth information and images captured by, for example, the 3-D camera 36 and/or the RGB camera 38 to the computing environment 12 via the communication link 46. The computing environment 12 may then use the depth information and captured images to, for example, create a virtual screen, adapt the user interface and control an application such as a game or word processor.

As shown in FIG. 2, computing environment 12 includes gestures library 192, structure data 198, gesture recognition engine 190, depth map processing and object reporting module 194, and operating system 196. Depth map processing and object reporting module 194 uses the depth maps to track the motion of objects, such as the user and other objects. To assist in the tracking of the objects, depth map processing and object reporting module 194 uses gestures library 190, structure data 198 and gesture recognition engine 190. In some embodiments, the depth map processing and object reporting module 194 uses a classifier 195 and a feature library 199 to identify objects. The feature library 199 may contain invariant features, such as rotation invariant features.

In one example, structure data 198 includes structural information about objects that may be tracked. For example, a skeletal model of a human may be stored to help understand movements of the user and recognize body parts. In another example, structural information about inanimate objects, such as props, may also be stored to help recognize those objects and help understand movement.

In one example, gestures library 192 may include a collection of gesture filters, each comprising information concerning a gesture that may be performed by the skeletal model. A gesture recognition engine 190 may compare the data captured by capture device 20 in the form of the skeletal model and movements associated with it to the gesture filters in the gesture library 192 to identify when a user (as represented by the skeletal model) has performed one or more gestures. Those gestures may be associated with various controls of an application. Thus, the computing environment 12 may use the gesture recognition engine 190 to interpret movements of the skeletal model and to control operating system 196 or an application based on the movements.

In one embodiment, depth map processing and object reporting module 194 will report to operating system 196 an identification of each object detected and the position and/or orientation of the object for each frame. Operating system 196 will use that information to update the position or movement of an object (e.g., an avatar) or other images in the display or to perform an action on the provided user-interface.

Figure 3A:
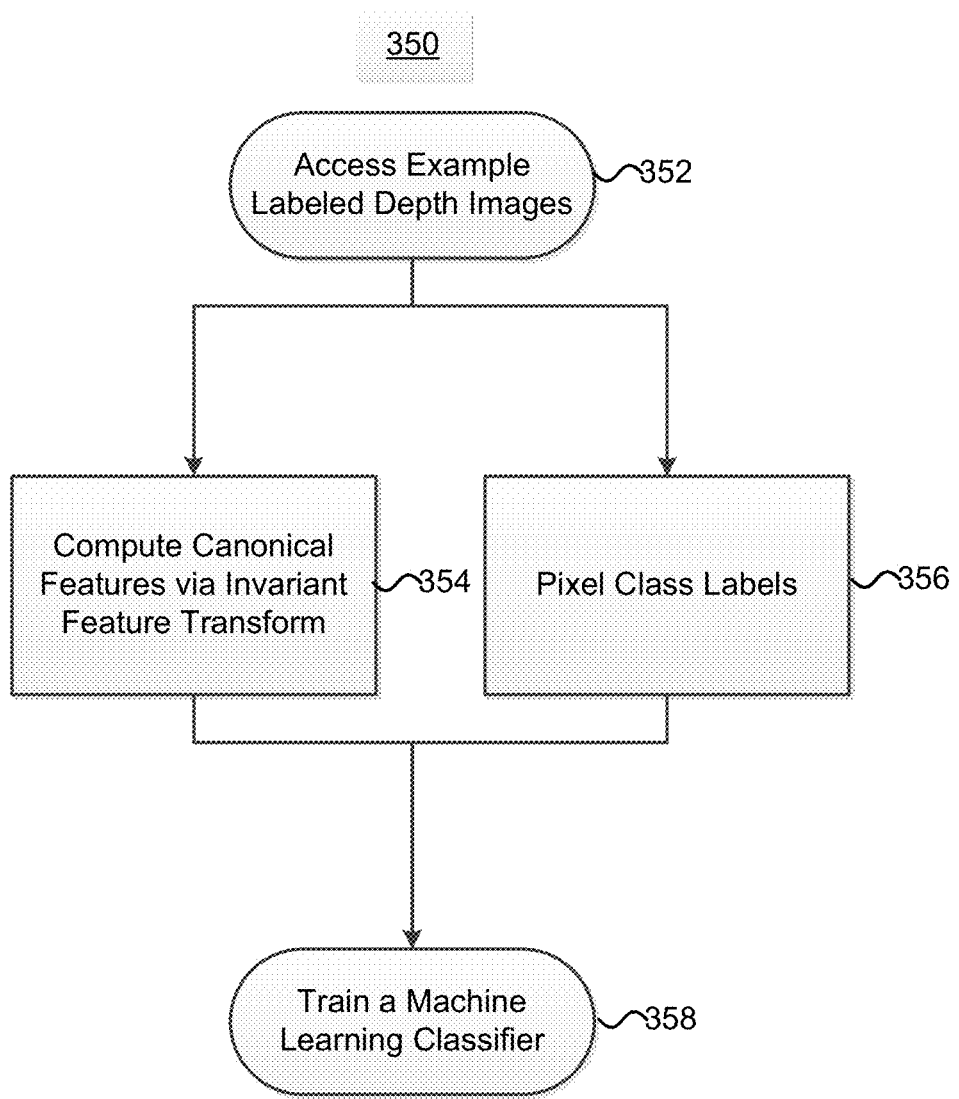
FIG. 3A is a flowchart of one embodiment of a process of training a machine learning classifier using invariant features.

FIG. 3A is a flowchart of one embodiment of a process 350 of training a machine learning classifier using invariant features. The features may be invariant to any combination of rotation, translation, and scaling. Rotation invariant features include in-plane and/or out-of-plane invariance. Process 350 may involve use of a capture device 20. The process 350 may create the machine learning classifier that is later used at run time to identify objects.

In step 352, one or more example depth maps (or depth images) are accessed. These images may have been captured by a capture device 20. These depth maps may be labeled such that each depth pixel has been classified, for instance manually, or procedurally using computer generated imagery (CGI). For example, each depth pixel may be manually or procedurally classified as being part of a finger, hand, torso, specific segment of a body, etc. The labeling of the depth pixels may involve a person studying the depth map and assigning a label to each pixel, or assigning a label to a group of pixels. The labels might instead be continuous in a regression problem. For example, one might label each pixel with a distance to nearby body joints. Note that because the process 350 may use rotation invariant features to train the classifier, the number of example depth maps may be kept fairly low. For example, it may not be necessary to provide example images which show a hand (or other object) in a wide variety of rotations.

In step 354, canonical features are computed using an invariant feature transform. Briefly, each labeled example image may be processed in order to extract rotation-invariant features. In one embodiment, a local coordinate system is defined for any given pixel using a combination of in-plane and out-of-plane orientation estimates, and depth. This local coordinate system may be used to transform a feature window prior to computing the features to achieve rotation invariance. The result of step 354 may be a set of canonical features. Step 354 will be discussed in more detail with respect to FIG. 3B. In step 356, class labels (or continuous regression labels) are assigned to corresponding features based on the pixel labels in the example images.

In step 358, the canonical features and corresponding labels are passed to a machine learning classification system to train a classifier 195. Note that this is performed after the transformation of step 354. Therefore, the features may be rotation invariant. If step 354 determined both in-plane and out-of-plane orientations, then the features may be both in-plane and out-of-plane invariant. If step 354 determined only in-plane orientations, then the features may be in-plane rotation invariant. If step 354 determined only out-of-plane orientations, then the features may be out-of-plane rotation invariant. The classifier 195 may be used at run-time to classify rotationally-normalized features extracted from new input images. The features may also be invariant to translation and/or scaling. In some embodiments, features that are determined to be useful at identifying objects are saved, such that they may be stored in a feature library 199 for use at run time.

Figure 3B:
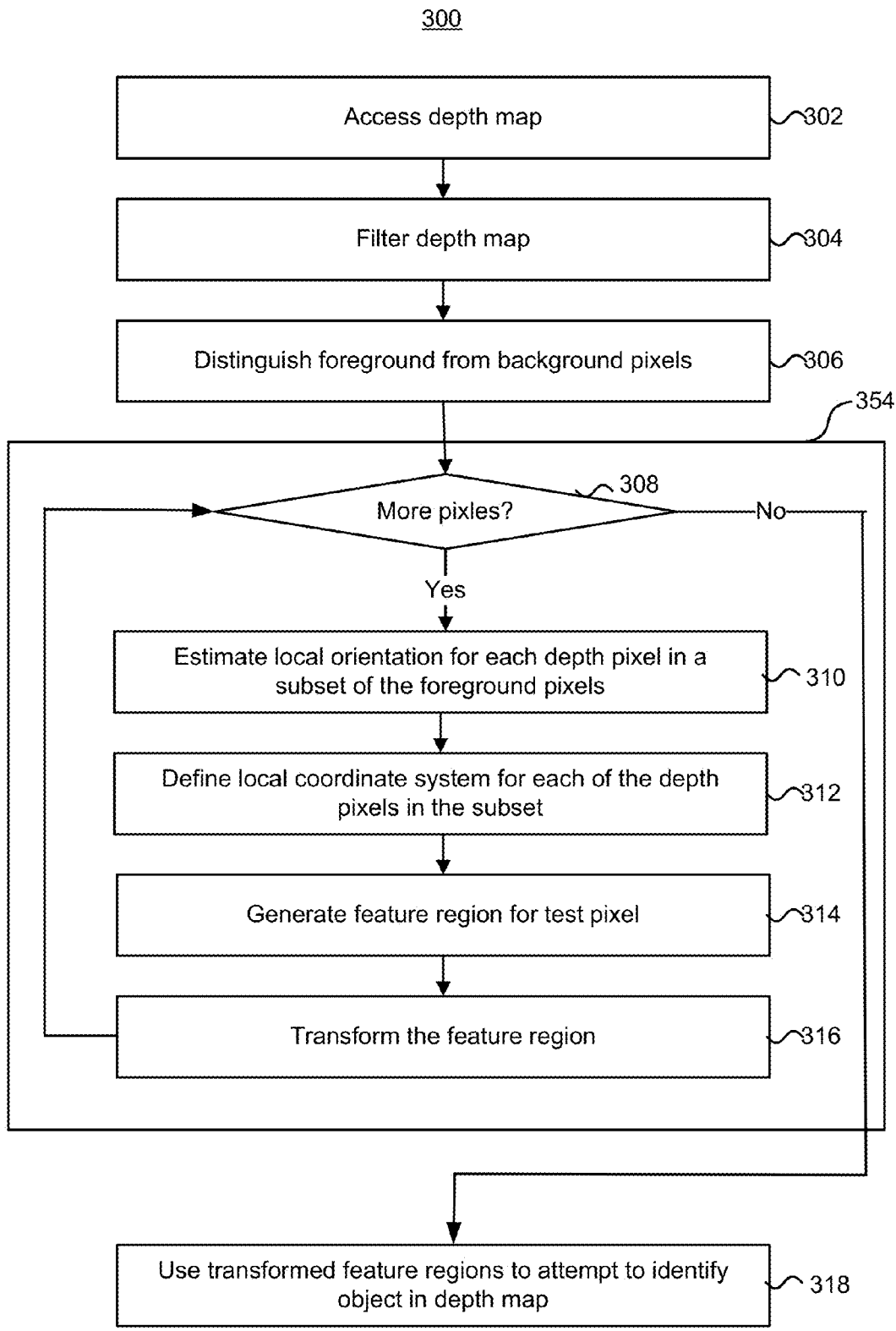
FIG. 3B is a flowchart that describes a process of using invariant features to identify objects using computer vision.

FIG. 3B is a flowchart that describes a process 300 of using invariant features to identify objects using computer vision. The features may be rotation invariant. Rotation invariant features include in-plane rotation invariant, out-of-plane rotation invariant, or both. The features may also be invariant to translation and/or scaling. Process 300 may be performed when a user is interacting with a motion capture system 10. Thus, process 300 could be used in a system such as depicted in FIG. 1 or 2. Process 300 may be used in a wide variety of other computer vision scenarios.

In step 302, a depth map is accessed. The capture device 20 may be used to capture the depth map. The depth map may include depth pixels. The depth map may be associated with an image coordinate system. For example, each depth pixel may have two coordinates (u, v) and a depth value. The depth map may be considered to be in a plane that is defined by the two coordinates (u, v). This plane may be based on the orientation of the depth camera and may be referred to herein as an imaging plane. If an object in the camera's field of view moves, it may be described as moving in-plane, out-of-plane or both. For example, rotating movement in the u, v plane (with points on the object retaining their depth values) may be referred to as in-plane rotation (axis of rotation is orthogonal to the u, v plane). Rotating movement that causes changes in depth values at different rates for different points on the object may be referred to as out-of-plane rotation. For example, rotation of a hand with the palm facing the camera is one example of in-plane rotation. Rotation of a hand with the thumb pointing towards and then away from the camera is one example of out-of-plane rotation.

In step 304, the depth map is filtered. In one embodiment, the depth map may be undistorted to remove the distortion effects from the lens. In other embodiments, upon receiving the depth map, the depth map may be down-sampled to a lower processing resolution such that the depth map may be more easily used and/or more quickly processed with less computing overhead. Additionally, one or more high-variance and/or noisy depth values may be removed and/or smoothed from the depth map and portions of missing and/or removed depth information may be filled in and/or reconstructed.

In step 306, the acquired depth map may be processed to distinguish foreground pixels from background pixels. Foreground pixels may be associated with some object (or objects) of interest to be analyzed. As used herein, the term "background" is used to describe anything in an image that is not part of the one objects of interest. For ease of discussion, a single object will be referred to when discussing process 300. Process 300 analyzes pixels in that object of interest. These pixels will be referred to as a subset of the pixels in the depth map.

Steps 308-316 describe processing individual pixels associated with the object of interest. In general, these steps involve performing an invariant feature transform. For example, this may be a rotation invariant transform. The transform may also be invariant to translation and/or scale. Note that steps 308-316 are one embodiment of step 354 from FIG. 3A.

In step 308, a determination is made whether there are more pixels in the subset to process. If so, processing continues with step 310 with one of the depth pixels. In step 310, a local orientation of the depth pixel is estimated. In one embodiment, the local orientation is an in-plane orientation. In one embodiment, the local orientation is an out-out-plane orientation. In one embodiment, the local orientation is both an in-plane orientation and an out-of-plane orientation. Further details of estimating a local orientation are discussed below.

In step 312, a local coordinate system is defined for the depth pixel. In some embodiments, the local coordinate system is a 3D coordinate system. The local coordinate system is based on the local orientation of the depth pixel. For example, if the user's hand moves, rotates, etc., then the local coordinate system moves with the hand. Further details of defining a local coordinate system are discussed below.

In step 314, a feature region is defined relative to the local coordinate system for the presently selected depth pixel. For example, a feature window is defined with its center at the depth pixel. One or more feature test points, feature test rectangles, Haar wavelets, or other such features may be defined based on the geometry of the feature window.

In step 316, the feature region is transformed from the local coordinate system to the image coordinate system. Further details of performing the transform are discussed below. Note that this may involve a transformation from the 3D space of the local coordinate system to a 2D space of the depth map.

Processing then returns to step 308 to determine if there are more depth pixels to analyze. If not, then processing continues at step 318. In step 318, the transformed feature regions are used to attempt to identify one or more objects in the depth map. For example, an attempt is made to identify a user's hand. This attempt may include classifying each pixel. For example, each pixel may be assigned a probability that it is part of a hand, head, arm, certain segment of an arm, etc.

In one embodiment, a decision tree is used to classify pixels. Such analysis can determine a best-guess of a target assignment for that pixel and the confidence that the best-guess is correct. In some embodiments, the best-guess may include a probability distribution over two or more possible targets, and the confidence may be represented by the relative probabilities of the different possible targets. In other embodiments the best-guess may include a spatial distribution over 3D offsets to body or hand joint positions. At each node of a decision tree, an observed depth value comparison between two pixels is made, and, depending on the result of the comparison, a subsequent depth value comparison between two pixels is made at the child node of the decision tree. The result of such comparisons at each node determines the pixels that are to be compared at the next node. The terminal nodes of each decision tree results in a target classification or regression with associated confidence.

In some embodiments, subsequent decision trees may be used to iteratively refine the best-guess of the one or more target assignments for each pixel and the confidence that the best-guess is correct. For example, once the pixels have been classified with the first classifier tree (based on neighboring depth values), a refining classification may be performed to classify each pixel by using a second decision tree that looks at the previous classified or regressed pixels and/or depth values. A third pass may also be used to further refine the classification or regression of the current pixel by looking at the previous classified or regressed pixels and/or depth values. It is to be understood that virtually any number of iterations may be performed, with fewer iterations resulting in less computational expense and more iterations potentially offering more accurate classifications or regressions, and/or confidences.

In some embodiments, the decision trees may have been constructed during a training mode in which the example images were analyzed to determine the questions (i.e., tests) that can be asked at each node of the decision trees in order to produce accurate pixel classifications. In one embodiment, foreground pixel assignment is stateless, meaning that the pixel assignments are made without reference to prior states (or prior image frames). One example of a stateless process for assigning probabilities that a particular pixel or group of pixels represents one or more objects is the Exemplar process. The Exemplar process uses a machine-learning approach that takes a depth map and classifies each pixel by assigning to each pixel a probability distribution over the one or more objects to which it could correspond. For example, a given pixel, which is in fact a tennis racquet, may be assigned a 70% chance that it belongs to a tennis racquet, a 20% chance that it belongs to a ping pong paddle, and a 10% chance that it belongs to a right arm. Further details of using decision trees are discussed in US Patent Application Publication 2010/0278384, titled "Human Body Pose Estimation," by Shotton et al., published on Nov. 4, 2010, which is hereby incorporated by reference. Note that it is not required that decision trees be used. Another technique that may be used to classify pixels is a Support Vector Machine (SVM). Step 318 may include using a classifier that was developed during a training session such as that of FIG. 3A.

As discussed above, part of step 354 (of both FIGS. 3A and 3B) is to estimate a local orientation of depth pixels. FIGS. 4A-4F will be referred to in order to discuss estimating a location local orientation of depth pixels with respect to the (u, v) coordinate system of the depth map. In these examples, the depth values are not factored in to the local orientation. Therefore, this may be considered to be an in-plane orientation.

Figure 4A:
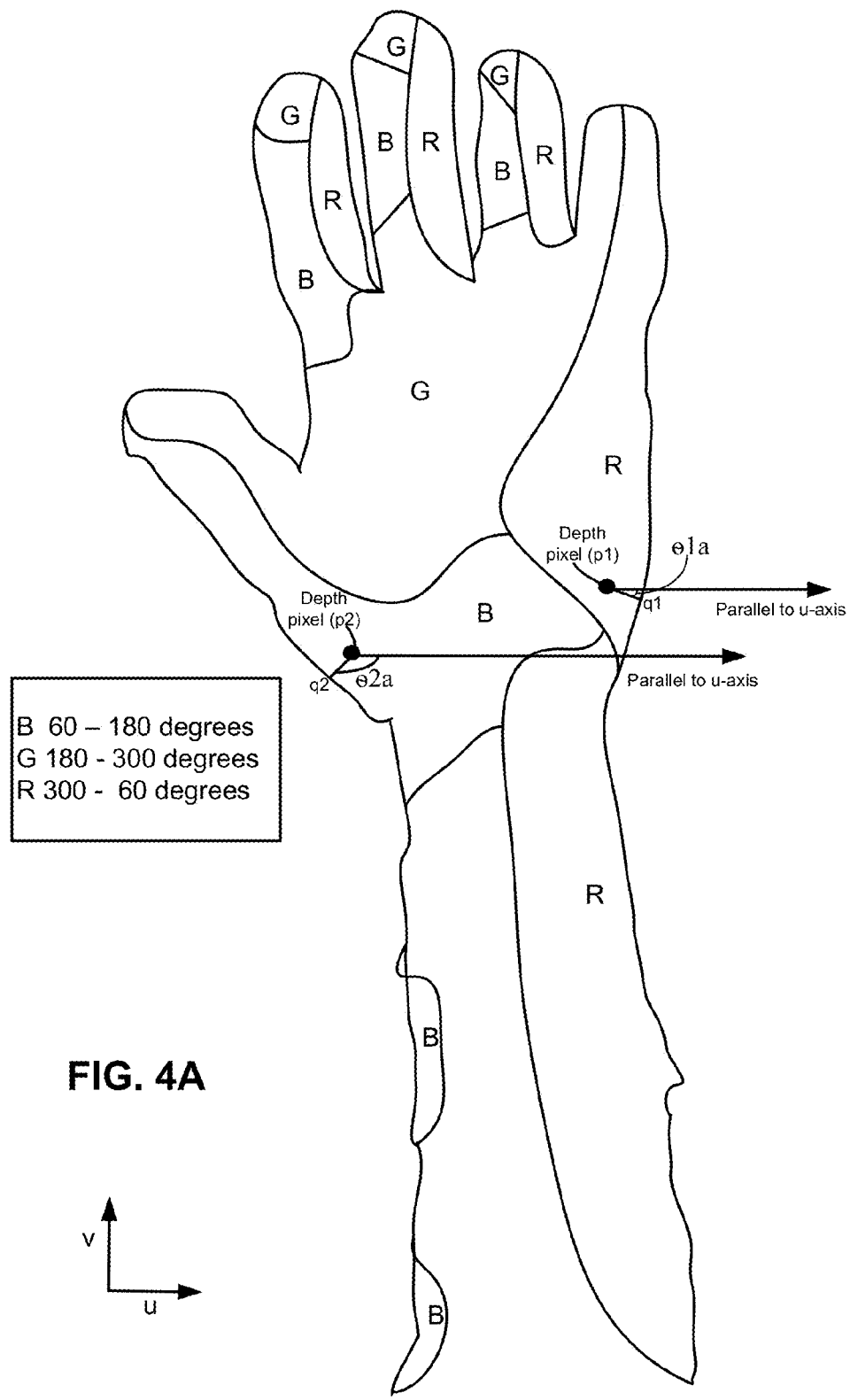
FIG. 4A depicts a depth map of an object for which in-plane local orientation of depth pixels has been estimated based on edges, in accordance with one embodiment.

FIG. 4A depicts a depth map of an object for which in-plane local orientation of depth pixels has been estimated, in accordance with one embodiment. Each depth pixel is assigned a value between 0-360 degrees, in this embodiment. The assignment is made such that if the object is rotated in-plane (e.g., in the (u, v) image plane) the depth pixel will have the same local orientation, or at least very close to the same value. For example, the depth pixel may have the same angle assigned to it regardless of rotation in the (u, v) image plane.

Note that the angle is with respect to any convenient reference axis. As one example, the depth map has a u-axis and a v-axis. The angle may be with respect to either axis, or some other axis. Two example depth pixels p1, p2 are shown. Two points q1, q2 are also depicted. The point q is the nearest point on the edge of the hand to the given depth pixel. A line is depicted from p to q. The angle θ is the angle of that line to the u-axis (or more precisely to a line that runs parallel to the u-axis). Note that if the hand were to be rotated in the (u, v) plane, that the angle θ would change by the same amount for all pixels. Therefore, the angle θ serves as a way of describing a local orientation of a depth pixel that is in-plane rotation invariant.

Figure 4B:
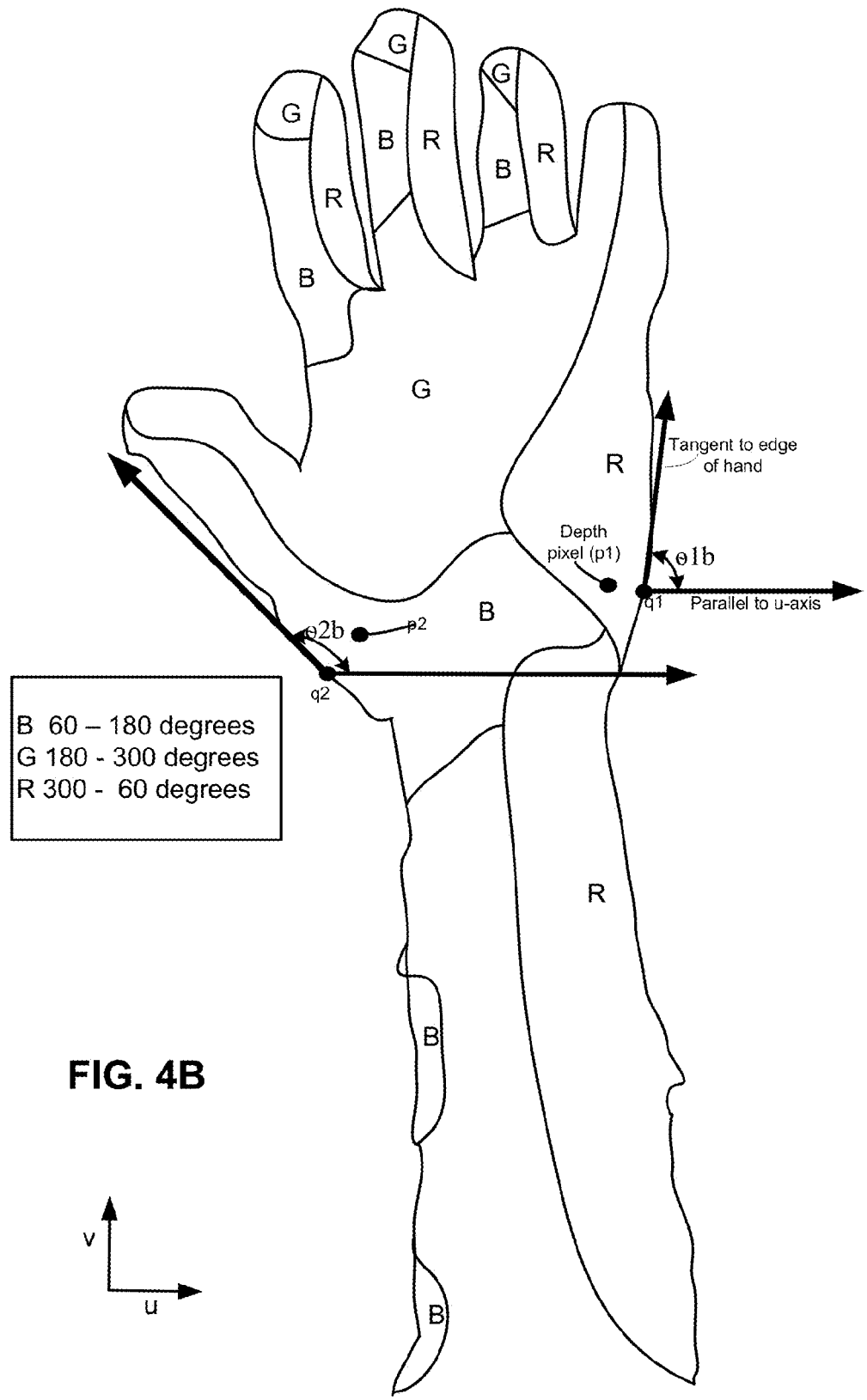
FIG. 4B depicts a depth map of an object for which in-plane local orientation of depth pixels has been estimated based on edges, in accordance with one embodiment.

FIG. 4B depicts a depth map of an object for which in-plane local orientation of depth pixels has been estimated, in accordance with one embodiment. This embodiment uses a different technique for determining the angle than the embodiment of FIG. 4A. In this embodiment, the angle is based on a tangent to the object at a point q. The two example depth pixels p1, p2 and the two points q1, q2 are depicted. The angle θ1a for point p1 is the tangent to the hand at q1. Similar reasoning applies for angle θ2a. Note that if the hand were to be rotated in the (u, v) plane, that the angle θ would change by the same amount for all pixels. Therefore, the angle θ serves as a way of describing a local orientation of a depth pixel that is in-plane rotation invariant.

In FIGS. 4A and 4B, for the purpose of illustration, the depth pixels are grouped into those with angles between 60-180, those between 180-300, and those between 300-60. In actual practice, no such grouping is required. Also, note that it is not required that the angle assignment be between 0-360 degrees. For example, it could be between −180 to +180 degrees, or another scheme. It may also be between 0-180, in which case the feature transform is rotationally invariant only up to a two-way ambiguity.

Figure 4C:
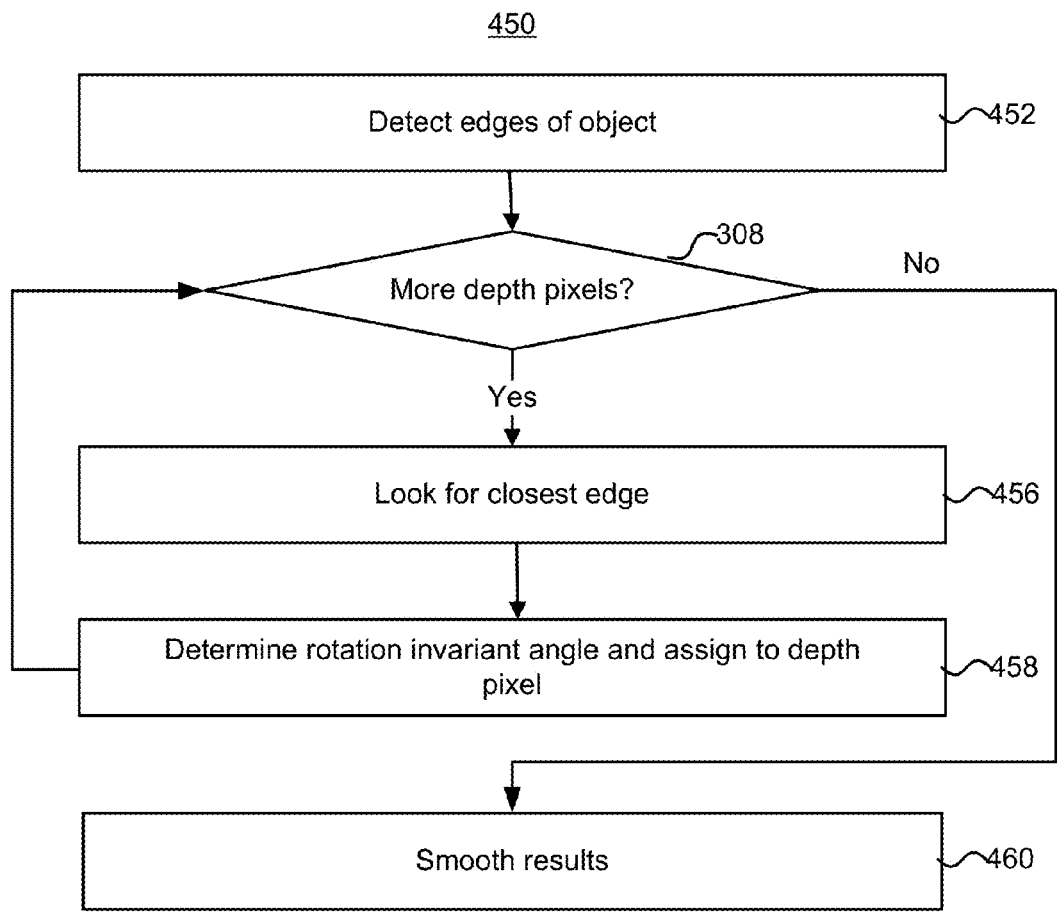
FIG. 4C is a flowchart of one embodiment of a process of assigning angles to depth pixels based on edges.

FIG. 4C is a flowchart of one embodiment of a process 450 of assigning an angle to a depth pixel. The process 450 may be performed once for each depth pixel in an object of interest. In process 450, the angle is determined relative to the nearest edge of the object. Therefore, process 450 may be used for either embodiment of FIG. 4A or 4B. Note that process 450 is one embodiment of estimating local orientation of step 310. In particular, process 450 is one embodiment of estimating in-plane local orientation.

In step 452, edges of the object are detected. The edge is one example of a reference line of the object of interest. A variety of edge detection techniques may be used. Since edge detection is well-known by those of ordinary skill in the art it will not be discussed in detail. Note that edge detection could be performed in a step prior to step 310.

In step 456, the closest edge to the present depth pixel is determined. For example, q1 in FIG. 4A or 4B is determined as the closest point on the edge of the hand to depth pixel p1. Likewise, q2 is determined as the closest point on the edge of the hand to depth pixel p2, when processing that depth pixel. This can be efficiently computed using, for example, distance transforms.

In step 458, a rotation invariant angle to assign to the depth pixel is determined. In one embodiment, the angle may be defined based on the tangent to the edge of the hand at the edge point (e.g., p1, p2). This angle is one example of a rotation invariant angle for the closest edge point. Since the closest edge point (e.g., q1) is associated to the depth pixel (p1), the angle may also be considered to be one example of a rotation invariant angle for the depth pixel. As noted, any convenient reference axis may be used, such as the u-axis of the depth map. This angle is assigned to the present depth pixel. Referring to FIG. 4B, θ1b is assigned to p1 and θ2b is assigned to p2.

In one embodiment, the angle may be defined based on the technique shown in FIG. 4A. As noted, any convenient reference axis may be used, such as the u-axis of the depth map. In this case, the angle is defined as the angle between the u-axis and the line between p and q. This angle is assigned to the present depth pixel. Referring to FIG. 4B, θ1 is assigned to p1 and θ2 is assigned to p2. Process 450 continues until angles have been assigned to all depth pixels of interest.

After all depth pixels have been assigned an angle, smoothing of the results may be performed in step 460. For example, the angle of each depth pixel may be compared to its neighbors, with outliers being smoothed.

Figure 4D:
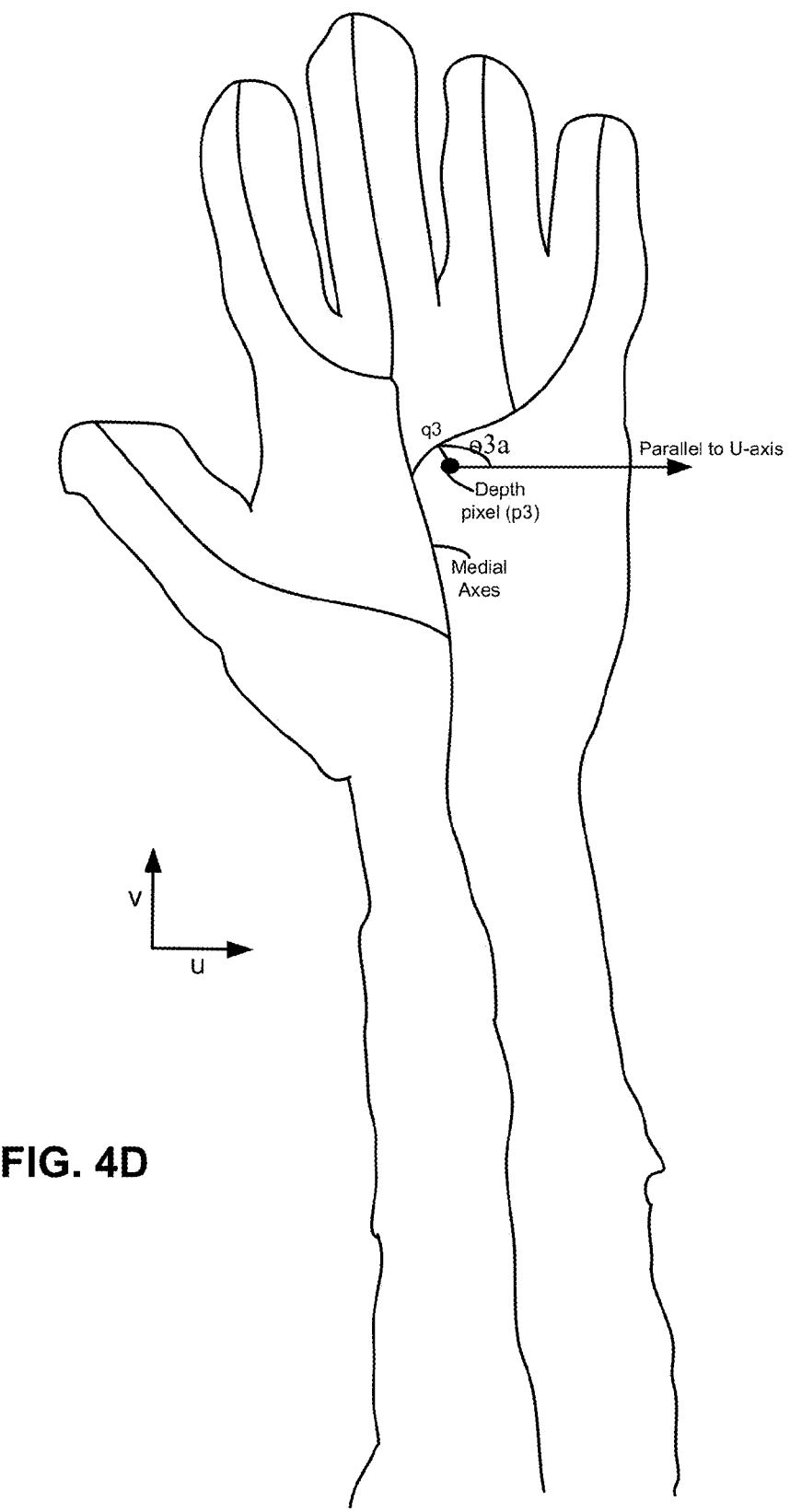
FIG. 4D depicts a depth map of an object for which in-plane local orientation of depth pixels has been estimated based on medial axes, in accordance with one embodiment.

Another technique for estimating a local in-plane orientation of depth pixels is based on medial axes. FIG. 4D depicts a hand to discuss such an embodiment. A medial axis may be defined as a line that is roughly a mid-point between two edges. To some extent, a medial axis may serve to represent a skeletal model. FIG. 4D shows a depth pixel p3, with its closest medial axis point q3. The angle θ3a represents a local orientation of depth pixel p3. Note that if the hand were to be rotated in the (u, v) plane, that the angle θ3a would change by the same amount for all pixels. Therefore, the angle θ3a serves as a way of describing a local orientation of a depth pixel that is in-plane rotation invariant. In this embodiment, the angle is defined based on the line parallel to the u-axis and the line between p and q.

Figure 4E:
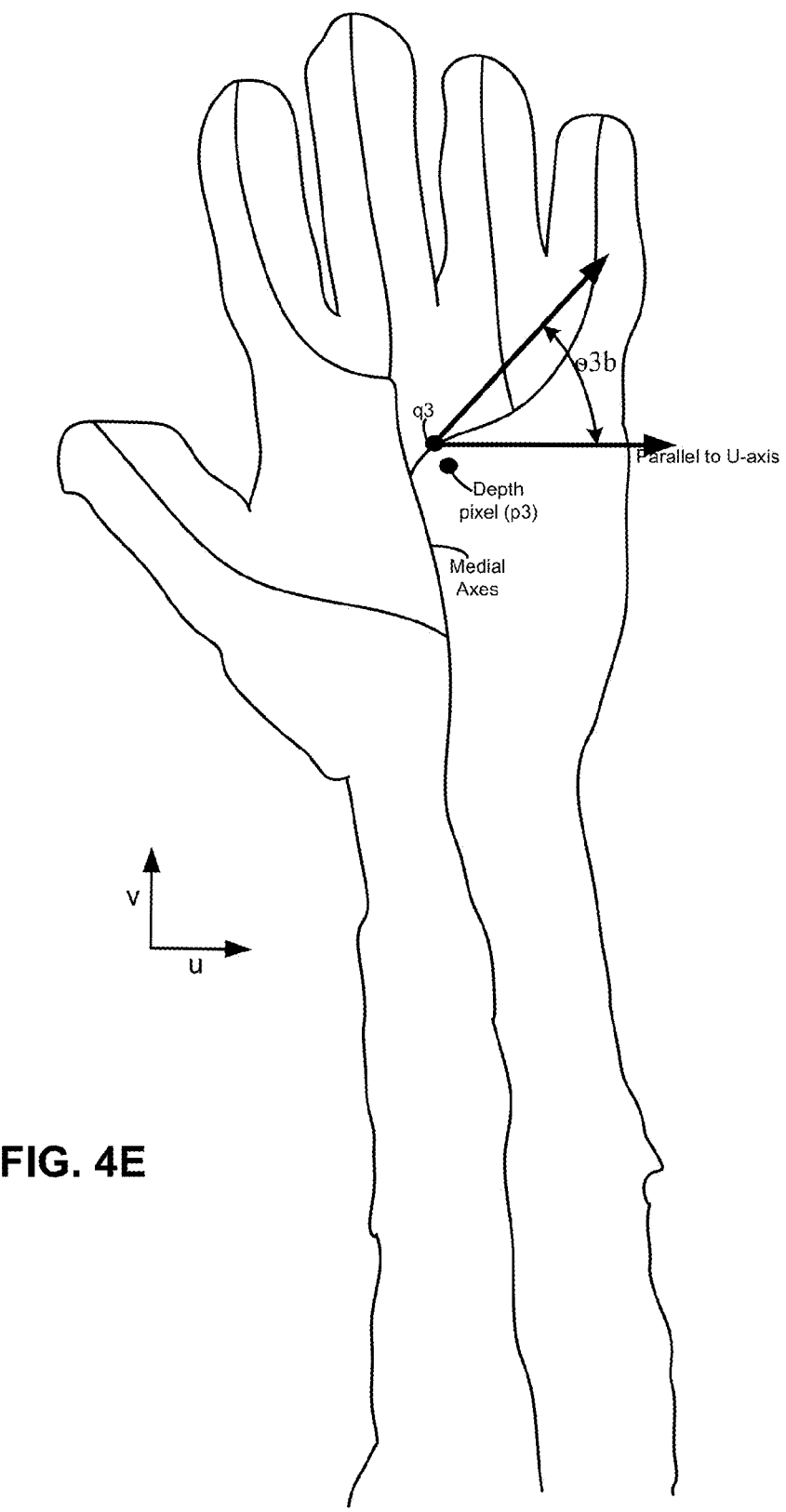
FIG. 4E depicts a depth map of an object for which in-plane local orientation of depth pixels has been estimated based on medial axes, in accordance with one embodiment.

FIG. 4E depicts a hand to discuss another embodiment for determining a rotation invariant angle. FIG. 4E shows a depth pixel p3, with its closest medial axis point q3. The angle θ3b represents a local orientation of depth pixel p3. In this example, θ3b is defined based on the tangent at point q3 to the medial axis. Note that if the hand were to be rotated in the (u, v) plane, that the angle θ3b would change by the same amount for all pixels. Therefore, the angle θ3b serves as a way of describing a local orientation of a depth pixel that is in-plane rotation invariant.

Figure 4F:
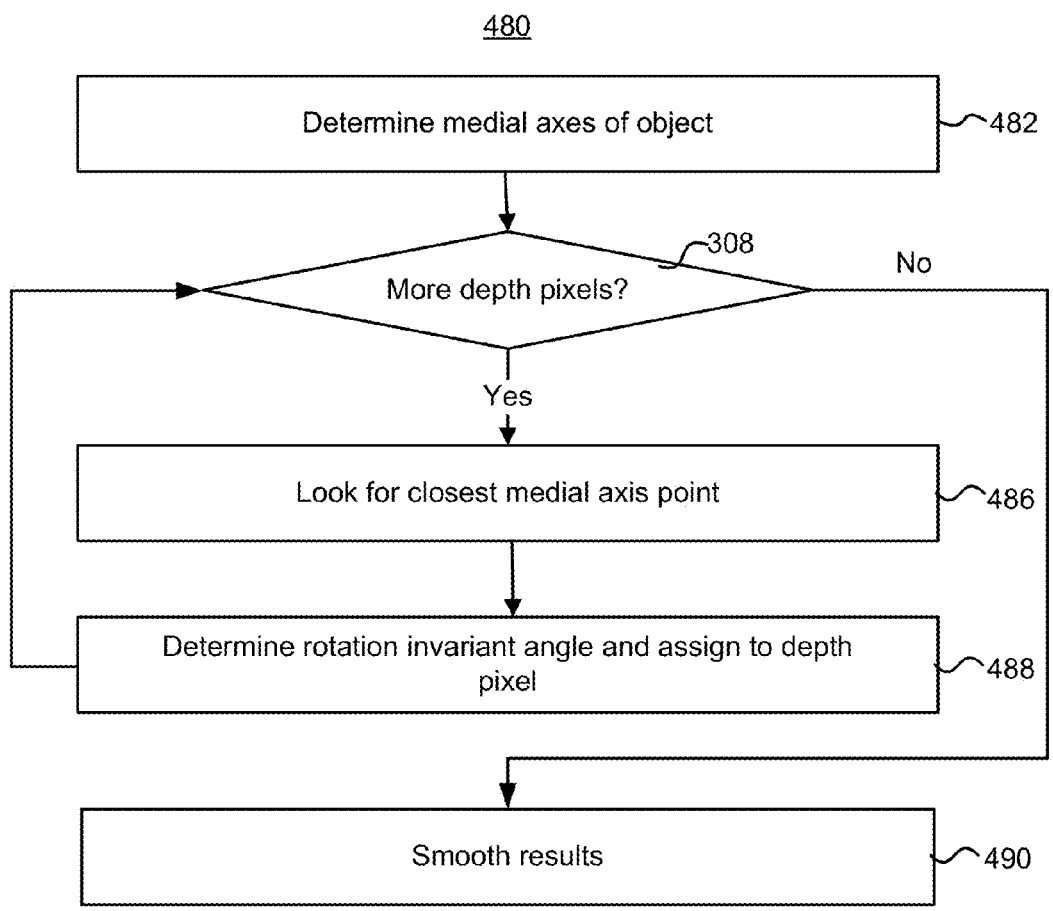
FIG. 4F is a flowchart of one embodiment of a process of assigning angles to depth pixels based on medial axes.

FIG. 4F is a flowchart of one embodiment of a process 480 of assigning angles to depth pixels. In this process 480, the angle is determined relative to the nearest medial axis of the object. Therefore, FIGS. 4D and 4E will be referred to when discussed process 480. Process 480 is one embodiment of steps 308 and 310. In particular, process 480 is one embodiment of estimating an in-plane orientation of depth pixels.

In step 482, medial axes of the object are determined. A medial axis may be defined based on the contour of the object. It can be implemented by iteratively eroding the boundaries of the object without allowing the object to break apart. The remaining pixels make up the medial axes. Medial axis computation is well-known by those of ordinary skill in the art it will not be discussed in detail. Example medial axes are depicted in FIGS. 4D and 4E. A medial axis is one example of a reference line in the object.

Next, depth pixels in the object are processed one by one. In step 486, the closest point on a medial axis to the present depth pixel is determined. Referring to either FIG. 4D or 4E, point q3 may be determined to be the closest point to p3.

In step 488, a rotation invariant angle for the depth pixel is determined. The angle may be based on the tangent to the medial axis at point q3, as depicted in FIG. 4E. The angle may also be determined based on the technique shown in FIG. 4D. As noted, any convenient reference axis may be used, such as the u-axis of the depth map. The angle is one example of a rotation invariant angle for the point q3. Since the closest medial axis point (e.g., q3) is associated to the depth pixel (p3), the angle may also be considered to be one example of a rotation invariant angle for the depth pixel. Referring to either FIG. 4D or 4E, angle θ3a or θ3b is determined. This angle is assigned to the present depth pixel. The process 480 continues until angles have been assigned to all depth pixels of interest.

After all depth pixels have been assigned an angle, smoothing of the results is performed in step 490. For example, the angle of each depth pixel may be compared to its neighbors, with outliers being smoothed.

Figure 5:
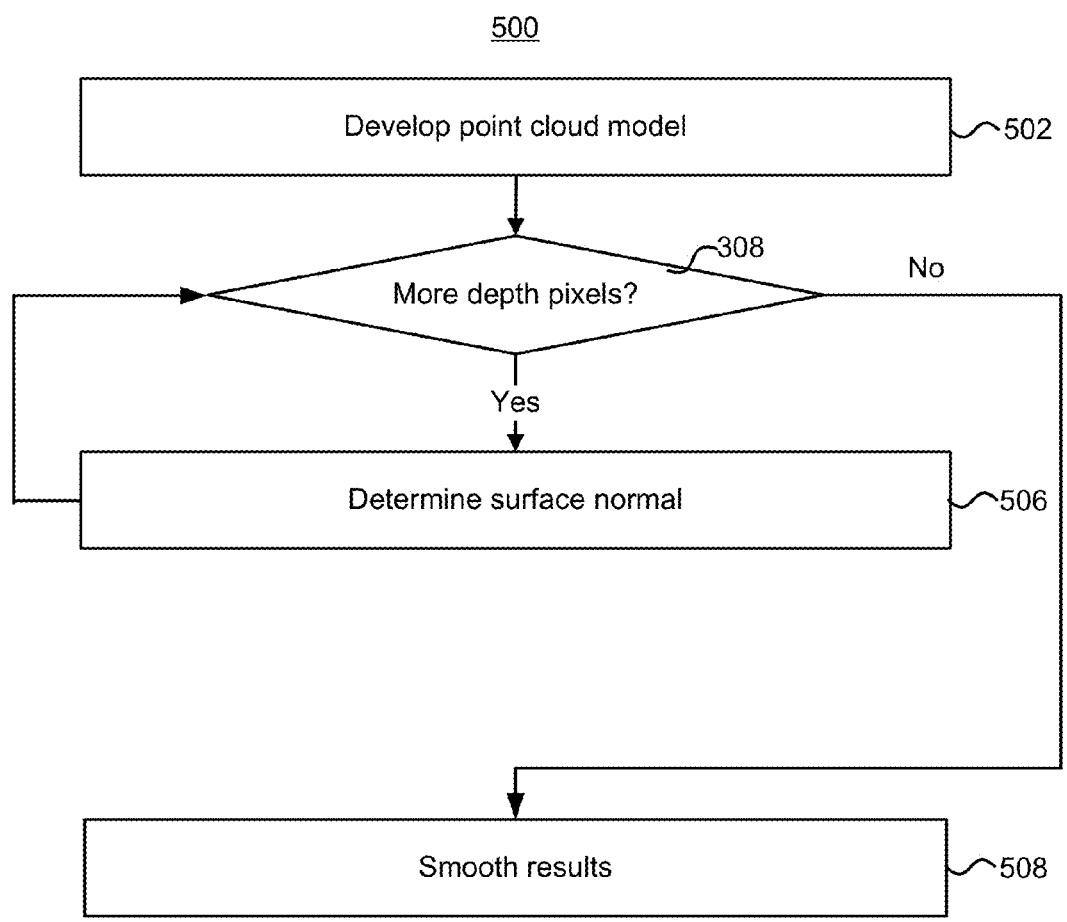
FIG. 5 is a flowchart of one embodiment of a process estimating local orientation of depth pixels for out-of-plane orientation.

As noted, the estimate of the local pixel orientation may be an estimate of the out-of-plane orientation. FIG. 5 is a flowchart of one embodiment of a process 500 estimating local orientation of depth pixels for out-of-plane orientation. In this embodiment, the out-of-plane orientation is based on the surface normal of the object of interest at the depth pixel. Process 500 is one embodiment of steps 308-310 and will be discussed with reference to FIG. 6A.

In step 502, a point cloud model is developed. The point cloud model may be a 3D model in which each depth pixel in the depth map is assigned a coordinate in 3D space, for example. The point cloud may have one point for each depth pixel in the depth map, but that is not an absolute requirement. To facilitate discussion, it will be assumed that each point in the point cloud has a corresponding depth pixel in the depth map. However, note that this one-to-one correspondence is not a requirement. Herein, the term "depth point" will be used to refer to a point in the point cloud.

Figure 6A:
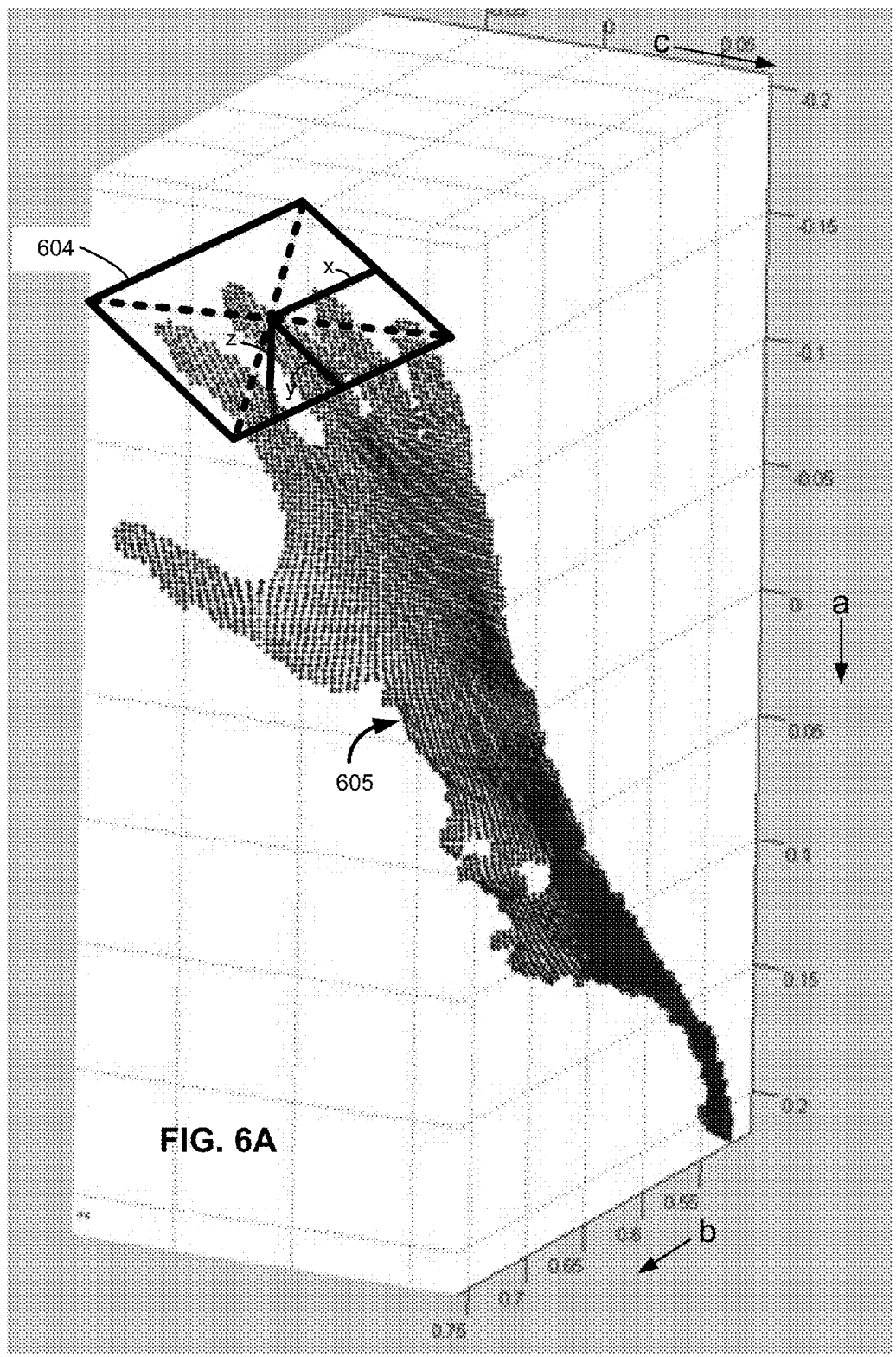
FIG. 6A and FIG. 6B depict different rotations of a point cloud model with one embodiment of a local coordinate system.

FIG. 6A depicts a point cloud model 605 of a hand and portion of an arm. The point cloud model is depicted within an (a, b, c) global coordinate system. Thus, an a-axis, b-axis, and c-axis of a global coordinate system are depicted. In some embodiments, two of the axes in the global coordinate system correspond to the u-axis and v-axis of the depth map. However, this correspondence is not a requirement. The position along the third axis in the global coordinate system may be determined based on the depth value for a depth pixel in the depth map. Note that the point cloud model 605 may be generated in another manner. Also note that using a point cloud model 605 is just one way to determine a surface normal. Other techniques could be used.

In step 504 of FIG. 5, a determination is made whether there are more depth pixels to process. Note that the processing here is of depth point in the point cloud 605.

In step 506, a surface normal is determined at the present point. By surface normal it is meant a line that is perpendicular to the surface of the object of interest. The surface normal may be determined by analyzing nearby depth points. The surface normal may be defined in terms of the (a, b, c) global coordinate system. In FIG. 6A, the surface normal is depicted as the z-axis that touches the second finger of the hand. The x-axis, y-axis, and z-axis form a local coordinate system for the pixel presently being analyzed. The local coordinate system will be further discussed below. Processing continues until a surface normal is determined for all depth points.

In step 508, smoothing of the surface normals is performed. Note that using surface normals is one example of how to determine a local orientation for depth pixels that may be used for out-of-plane rotation. However, other parameters could be determined. Also, as noted above, there may be one depth point in the point cloud 605 for each depth pixel in the depth map. Therefore, the assignment of surface normals to depth pixels may be straightforward. However, if such a one-to-one correspondence does not exist, a suitable calculation can be made to assign surface normals to depth pixels in the depth map. Finally, it will be understood that although the discussion of FIG. 5 was of determining a surface normal to a depth point, this is one technique for determining a local orientation of a depth pixel.

Figure 6B:
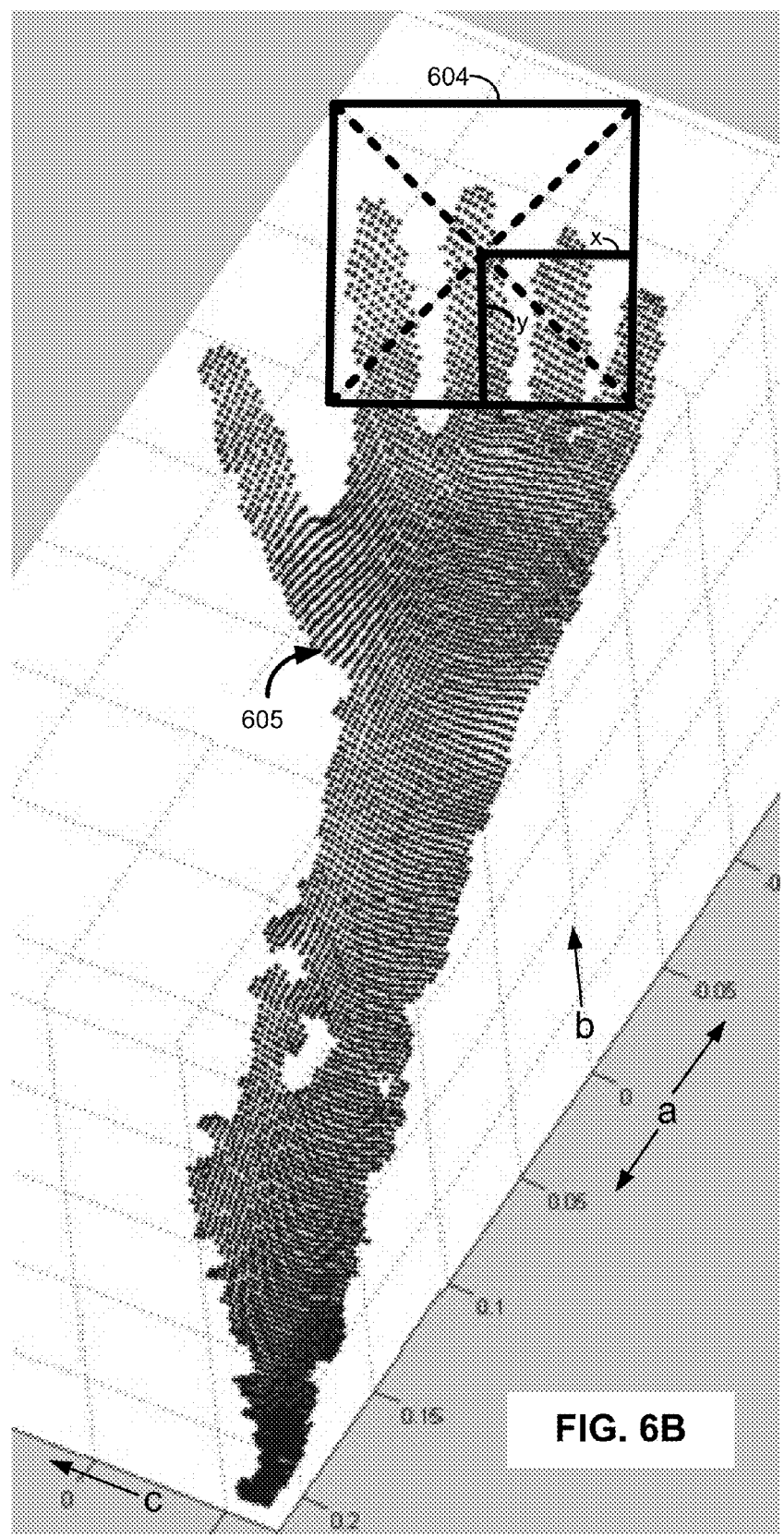

As noted in step 354, after determining the local orientation of depth pixels, a local coordinate system is determined for each of the depth pixels. FIGS. 6A and 6B show an object with a local coordinate system (labeled as x-axis, y-axis, z-axis) for one of the depth points. The local coordinate system has three perpendicular axes, in this embodiment. The origin of the local coordinate system is at one of the 3D depth points in the object of interest. One axis (e.g., z-axis) is normal to the surface of the object of interest. That is, it is the surface normal at a certain depth point. Determining the x-axis and the y-axis will be discussed below. Also note that, although for purposes of illustration the local coordinate system is depicted relative to one of the depth points in the depth cloud 605, the local coordinate system is considered to be a local coordinate system for one of the depth pixels in the depth map.

A feature region or window 604 is also depicted in FIGS. 6A-6B. The dashed lines are depicted to demonstrate the position of the feature window 604 relative to the local coordinate system. The feature window 604 may be used to help define features (also referred to as "feature probes"). For example, a feature probe can be defined based on the origin of the local coordinate system and some point in the feature window. Note that the feature window may be transformed to the depth map prior to using the feature probe.

In an embodiment in which the object is a hand, the local coordinate system moves consistently with the hand. For example, if the hand rotates, the local coordinate system rotates by a corresponding amount. Of course, the object could be any object. Thus, more generally, the local coordinate system moves consistently with the object. In some embodiments, features are defined based on the local coordinate system. Therefore, the features may be invariant to factors such as rotation, translation, scale, etc.

Referring now to FIG. 6B, the hand has been rotated relative to the hand of FIG. 6A. However, note that the x-axis and the y-axis are in the same position relative to the hand. The z-axis is not depicted in FIG. 6B, but it will be understood that it is still normal to the surface at the location of the depth point. The feature window 604 is also in the same position relative to the local coordinate system. Therefore, the feature window 604 is also in the same position relative to the hand. Note that this means that if a feature is defined in the local coordinate system, that the feature will automatically rotate with the hand (or other object).

Figure 7:
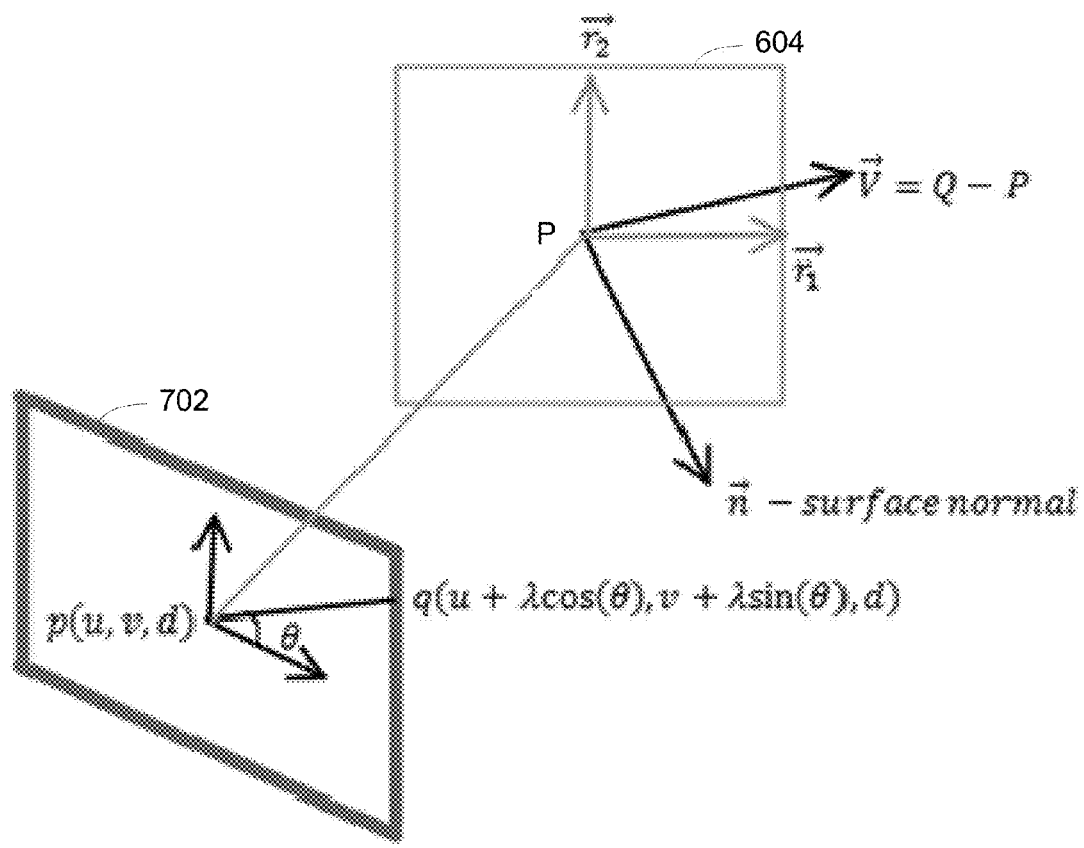
FIG. 7 depicts a 2D image coordinate system and a 3D local coordinate system used in various embodiments, with a corresponding feature window in each coordinate system.

As discussed above, in some embodiments, there is a 2D coordinate system for the depth map (with each depth pixel having a depth value) and a 3D local coordinate system for each depth pixel of interest. FIG. 7 depicts an image window 702 associated with a 2D depth image coordinate system and a corresponding window 604 in a 3D local coordinate system. The image window 702 represents a portion of the depth map. The point p(u, v, d) represents the test pixel from the depth map, where (u, v) are image coordinates and d is depth. The point q(u+λ cos(θ), v+λ sin(θ), d) represents the point of interest, also in the depth map. The point of interest could be any pixel in the depth image.

The arrows in the image window 702 that originate from pixel p are parallel to the u-axis and the v-axis. A line is depicted between the pixel p and the point of interest q. The angle θ is the estimated in-plane rotation, which in this example is defined as the angle between the line and a reference axis. In this example, the reference axis is the u-axis, but any reference axis could be chosen.

Referring back to FIG. 4A or 4B, the point p(u, v, d) might represent one of the depth pixels, such as p1. The point q might represent the nearest point on the edge of the hand, such as q1. The angle θ might represent the angle θ1a between as sown in FIG. 4A. The angle θ might represent the angle θ1b between the tangent to the edge of the hand at point q1 and some reference axis, as shown in FIG. 4B.

Referring back to FIG. 4D or 4E, the point p(u, v, d) might represent the depth pixel p3. The point q might represent the nearest point on the medial axis, q3. The angle θ might represent the angle θ3a between as depicted in FIG. 4D. The angle θ might represent the angle θ3b between the tangent to the medial axis at point q3 and some reference axis, as depicted in FIG. 4E. The window 604 in the local 3D coordinate system contains the point P, which corresponds to pixel p in the 2D depth map. For the sake of illustration, point P could be the point in the point cloud of FIGS. 6A and 6B from which the surface normal (z-axis) originates. Window 604 represents a feature window 604 in the local 3D coordinate system. Examples of a local coordinate system and feature window 604 were discussed with respect to FIGS. 6B and 6B.

A vector $\vec{n}$, which corresponds to the surface normal, is depicted with its tail at point P. A vector $\vec{V}$ has its tail at point P and its head at point Q. Point Q is the point in 3D space that corresponds to point q in the 2D depth map. Vectors $\vec{r_1}$ and $\vec{r_2}$ may correspond to the x-axis and the y-axis in the local coordinate system (see, for example, FIGS. 6A-6B). Techniques for transforming between the local 3D coordinate system and the 2D image coordinate system will now be discussed. These techniques may be used for step 316.

The following describes a transformation from a 3D point XW (where the first two coordinates are usually defined between [−1,1] and the 3rd coordinate is typically zero) in a canonical window into depth pixel coordinates x. Equation 1 states a general form for the transformation equation.

$$x = deHom(\Phi(RSX_w + \vec{t}))  \quad \text{Eq. 1}$$

The transformation equation applies a rotation matrix R, a diagonal scaling matrix S, and a camera projection function $\Phi$. The vector $\vec{t}$ is a translation. The camera matrix projects from 3D into 2D.

In Equation 1, deHom(.) is the matrix given by $$deHom\left(\begin{bmatrix} X \\ Y \\ Z \end{bmatrix}\right) = \begin{bmatrix} X/Z \\ Y/Z \\ 1 \end{bmatrix} = \begin{bmatrix} X/Z \\ Y/Z \end{bmatrix} \quad \text{Eq. 2}$$

In order to derive the rotation matrix R and the vector $\vec{t}$, the following is considered. The present pixel in the depth map being examined may be defined as p(u, v, d), where (u, v) are the depth map pixel coordinates and "d" is a depth value for the depth pixel.

Next, some point of interest "q" relative to the present depth pixel is considered. The point of interest may be any point. One example is the closest edge point, as discussed in FIGS. 4A-4C. Another example is the closest medial axis point, as discussed in FIGS. 4D-4F. However, it will be understood that some other point of interest may be determined. Note that these points of interest may be selected such that a local orientation of the depth pixel that is in-plane rotation invariant may be determined. An estimated in-plane rotation θ is also determined, as in the examples above.

Furthermore, an estimated out-of-plane rotation local orientation is determined. For example, the surface normal is estimated as discussed with respect to FIG. 5.

Additionally, window scaling (sx, sy, sz) are pre-specified, with $S = diag([s_x, s_y, s_z])$. This window may be used for the feature window 604. Note that if the window scaling is defined in 3D, then the window may be given actual measurements, such that after it is projected to 2D it will scale properly. For example, the window could be defined as being 100 mm on each of three sides. When projecting back to the 2D space, the feature window 604 scales properly. Referring back to FIGS. 6A-6B, the feature window 604 was depicted in two-dimensions (x, y) for clarity. However, the feature window 604 can also be defined as a three dimensional object, using the z-axis.

Referring again to transformation equation (Eq. 1), $\Phi(.)$ refers to a generic camera projection function that transforms a 3D point in the camera coordinate system into a pixel homogeneous coordinate. The inverse transformation is given by $\Phi^{-1}(.)$. The camera projection function may be used to factor in various physical properties such as focal lengths ($f_1$, $f_2$), principal point ($c_1$, $c_2$), skew coefficient ($\alpha$), lens distortion parameters etc. An example of a camera projection function that does not account for lens distortion is given by $\Phi(X)=KX$, where K is a camera matrix as shown in Equation 3. A more general camera projection function that does account for radial distortion can be used instead. Camera projection functions are well known and, therefore, will not be discussed in detail.

$$K = \text{camera matrix} = \begin{bmatrix} f_1 & \alpha f_1 & c_1 \\ 0 & f_2 & c_2 \\ 0 & 0 & 1 \end{bmatrix} \quad \text{Eq. 3}$$

The rotation matrix may be computed as in Equation 4.

$$R_{3\times 3} = [\vec{r_1} \vec{r_2} \vec{r_3}] \quad \text{Eq. 4}$$

In Equation 4, the vector $\vec{r_3}$ may be a unitized version of the surface normal. Note that this may be the z-axis of the window 604. The vector $\vec{r_1}$ (x-axis) may be the component of $\vec{V}$ that is orthogonal to the surface normal. Recall that $\vec{V}$ was defined in FIG. 7 as Q–P. The vector $\vec{V}$ may be referred to herein as an in-plane rotation-variant vector. The vector $\vec{r_2}$ (y-axis) may be computed as the cross product of $\vec{r_3}$ and $\vec{r_2}$. The following Equations summarize the foregoing.

$$\vec{r_3} = \text{unitize}(\vec{n}) \quad \text{Eq. 5}$$

$$\vec{r_1} = \text{unitize}(\vec{V} - (\vec{V}^T \vec{r_3})\vec{r_3}) \quad \text{Eq. 6}$$

$$\vec{r_2} = \vec{r_3} \times \vec{r_1} \quad \text{Eq. 7}$$

The translation vector $\vec{t}$ may be computed as in Equation 8.

$$\vec{t} = P = \left(\Phi^{-1}\left(\begin{bmatrix} p \\ 1 \end{bmatrix}\right)\right)d \quad \text{Eq. 8}$$

The vector $\vec{V}$ may be computed as in Equations 9A-9C.

$$\text{unitize}\left(\left(\Phi^{-1}\left(\begin{bmatrix} q \\ 1 \end{bmatrix} - \begin{bmatrix} p \\ 1 \end{bmatrix}\right)\right)d\right) \quad \text{Eq. 9A}$$

$$\text{unitize}\left(\Phi^{-1}\left(\begin{bmatrix} q-p \\ 0 \end{bmatrix}\right)\right) \quad \text{Eq. 9B}$$

$$\text{unitize}\left(\Phi^{-1}\left(\begin{bmatrix} \cos(\theta) \\ \sin(\theta) \\ 0 \end{bmatrix}\right)\right) \quad \text{Eq. 9C}$$

For a 3D feature transform, and in the absence of radial distortion, the full 3D transform may be computed as in Equations 10A and 10B.

$$T_{3\times 4} = K\left(\begin{bmatrix} s_x & 0 & 0 \\ 0 & s_y & 0 \\ 0 & 0 & s_z \end{bmatrix} [R_{3\times 3} \vec{t}]\right) \quad \text{Eq. 10A}$$

$$x = \begin{bmatrix} u \\ v \\ 1 \end{bmatrix} = \text{deHom}\left(T_{3\times 4} \begin{bmatrix} x_w \\ y_w \\ z_w \\ 1 \end{bmatrix}\right) \quad \text{Eq. 10B}$$

For a 2D feature in the canonical XY-plane, the direct transformation from canonical coordinates (xw, yw) in a [−1, 1] window to depth pixel coordinates in the depth map may be determined by pre-computing the homography transformation H as Equation 11A and then calculating x, as in Equation 11B.

$$H_{3\times 3} = K([s_1\vec{r_1} \; s_2\vec{r_2} \; \vec{t}]) \quad \text{Eq. 11A}$$

$$x = \begin{bmatrix} u \\ v \\ 1 \end{bmatrix} = \text{deHom}\left(H \begin{bmatrix} x_w \\ y_w \\ 1 \end{bmatrix}\right) \quad \text{Eq. 11B}$$

Performing the transform in the other direction may be as in Equation 12.

$$\begin{bmatrix} x_w \\ y_w \\ 1 \end{bmatrix} = \text{deHom}\left(H^{-1} \begin{bmatrix} u \\ v \\ 1 \end{bmatrix}\right) \quad \text{Eq. 12}$$

Figure 8:
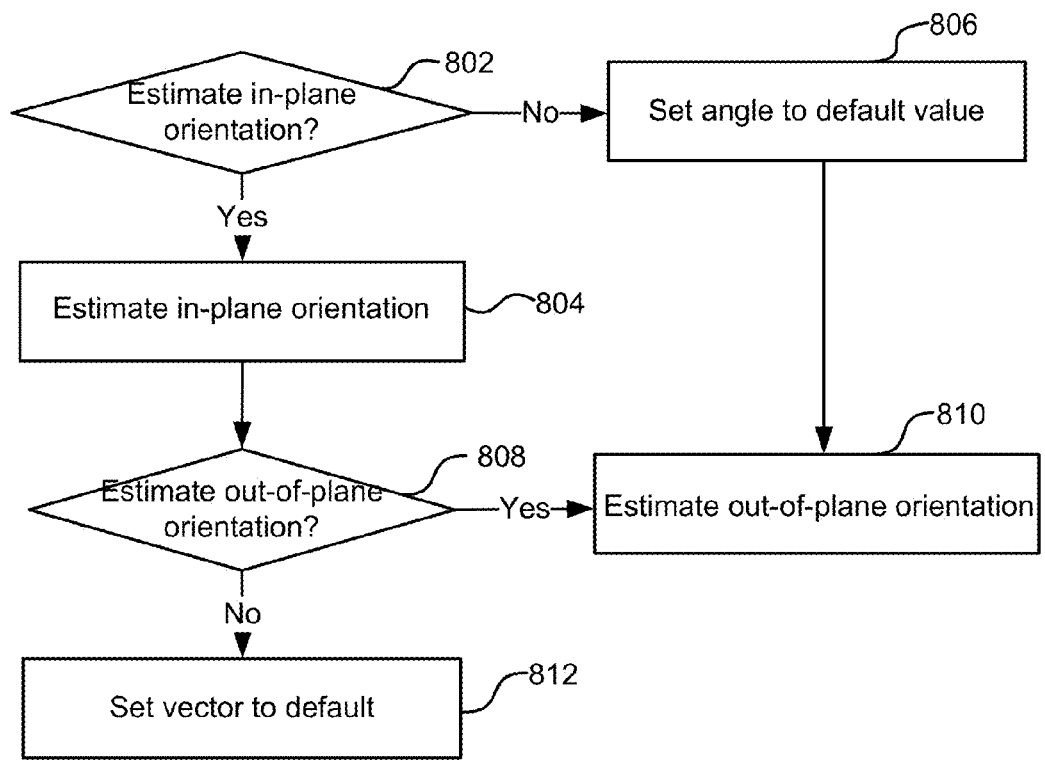
FIG. 8 is a flowchart of one embodiment of a process of establishing a local in-plain and/or out-of-plane orientation for a depth pixel.

As noted above, the local orientation may be based on in-plane, out-of-plane, or both. FIG. 8 is a flowchart of one embodiment of a process 800 of establishing a local orientation for a depth pixel factoring in the different possibilities. Process 800 may be repeated for each depth pixel for which a local orientation is to be determined.

In step 802, a determination is made whether an estimate of a local in-plane orientation is to be made. If so, then the in-plane estimate is made in step 804. Techniques for determining a local in-plane orientation have been discussed with respect to FIGS. 4A-4F. As noted, the estimate of the in-plane orientation may be an angle with respect to some reference axis in the depth map (or 2D image coordinate system). If the in-plane estimate is not to be made, then the angle θ may be set to a default value in step 806. As one example, the angle θ may be set to 0 degrees. Therefore, all depth pixels will have the same angles.

Note that regardless of whether or not the local in-plane estimate is made, the processing to determine the local coordinate system may be the same. For example, referring to Equations above that use the angle θ, the calculations may be performed in a similar manner by using the default value for θ.

In step 808, a determination is made whether an estimate of a local out-of-plane orientation is to be made. If so, then the out-of-plane estimate is made in step 810. Note that if the in-plane orientation was not determined, then the out-of-plane orientation is determined in step 810. Techniques for determining a local out-of-plane orientation have been discussed with respect to FIG. 5. As noted, the estimate of the out-of-plane orientation may be a surface normal of the object at a given depth pixel or point in a point cloud model. Thus, the output of the estimate may be a vector.

If the out-of-plane estimate is not to be made, then the vector may be set to a default value in step 812. As one example, the vector may be set to being parallel to the optical axis of the camera. Therefore, all depth pixels will have the same vectors.

Note that regardless of whether or not the local out-of-plane estimate is made, the processing to determine the local coordinate system may be the same. For example, referring to Equations above that use the vector $\vec{n}$, the calculations may be performed in a similar manner by using the default value for vector $\vec{n}$.

FIG. 9 illustrates an example of a computing environment including a multimedia console (or gaming console) 100 that may be used to implement the computing environment 12 of FIG. 2. The capture device 20 may be coupled to the computing environment. As shown in FIG. 9, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. In some embodiments, the capture device 20 of FIG. 2 may be an additional input device to multimedia console 100.

FIG. 10 illustrates another example of a computing environment that may be used to implement the computing environment 12 of FIG. 2. The capture device 20 may be coupled to the computing environment. The computing environment of FIG. 10 is only one example of a suitable computing environment and is not intended to suggest any limitation as to the scope of use or functionality of the presently disclosed subject matter. Neither should the computing environment 12 of FIG. 2 be interpreted as having any dependency or requirement relating to any one or combination of components illustrated in the exemplary operating environment of FIG. 10. In some embodiments, the various depicted computing elements may include circuitry configured to instantiate specific aspects of the present disclosure. For example, the term circuitry used in the disclosure can include specialized hardware components configured to perform function(s) by firmware or switches. In other examples, the term circuitry can include a general-purpose processing unit, memory, etc., configured by software instructions that embody logic operable to perform function(s). In embodiments where circuitry includes a combination of hardware and software, an implementer may write source code embodying logic and the source code can be compiled into machine readable code that can be processed by the general purpose processing unit.

In FIG. 10, the computing system 220 comprises a computer 241, which typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The computer 241 may also include other removable/non-removable, volatile/nonvolatile computer storage media. By way of example, FIG. 10 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 10 illustrates operating system 225, application programs 226, other program modules 227, and program data 228.

The drives and their associated computer storage media discussed above and illustrated in FIG. 10, provide storage of computer readable instructions, data structures, program modules and other data for the computer 241. In FIG. 10, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 34, 36 and capture device 20 of FIG. 2 may define additional input devices for the computer 241. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 5. The logical connections depicted in FIG. 5 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 10 illustrates remote application programs 248 as residing on memory device 247. It will be appreciated that the network connections shown are exemplary and other means of establishing a communications link between the computers may be used.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    accessing a depth map that includes a plurality of depth pixels, the depth map is associated with an image coordinate system having a plane;
    estimating a local orientation for each depth pixel in a subset of the depth pixels, the local orientation includes an in-plane orientation relative to the plane of the image coordinate system, determining the local orientation for the in-plane orientation comprises: determining a closest point between a test depth pixel and a reference line of an object in the depth map, and determining a rotation invariant angle for the test depth pixel based on an angle between a reference axis and a line between the test depth pixel and the closest point;
    defining a local coordinate system for each of the depth pixels in the subset, each local coordinate system is based on the local orientation of the corresponding depth pixel;
    defining a feature region relative to the local coordinate system for each of the depth pixels in the subset;
    transforming the feature region for each of the depth pixels in the subset from the local coordinate system to the image coordinate system; and
    using the transformed feature regions to process the depth map.

2. The method of claim 1, wherein the using the transformed feature regions to process the depth map includes:
    classifying features from the depth map based on the transformed feature regions.

3. The method of claim 1, wherein the using the transformed feature regions to process the depth map includes:
    training a machine learning classifier based on the transformed feature regions.

4. The method of claim 1, wherein the local orientation includes an out-of-plane orientation relative to the plane of the image coordinate system, wherein the estimating a local orientation includes estimating an out-of-plane rotation, the out-of-plane rotation is defined by a surface normal to the object in the depth map at a test depth pixel.

5. The method of claim 4, wherein the defining a local coordinate system for each of the depth pixels in the subset includes defining a z-axis of the local coordinate system as being the surface normal.

6. The method of claim 1, wherein the local orientation includes an out-of-plane orientation relative to the plane of the image coordinate system, wherein the defining a local coordinate system for each of the depth pixels in the subset includes:
    determining a vector in 3D space from a test depth pixel to a point of interest;
    determining a surface normal to the object in the depth map; and
    establishing an x-axis that is the component of the vector in 3D space that is orthogonal to the surface normal.

7. The method of claim 6, wherein the defining a local coordinate system for each of the depth pixels in the subset includes establishing a y-axis as the cross product of a z-axis and the x-axis.

8. A system comprising:
    a depth camera for generating depth maps that includes a plurality of depth pixels, each pixel having a depth value, each depth map is associated with a 2D image coordinate system;
    logic coupled to the depth camera, the logic is operable to:

access a depth map from the depth camera, the depth map is associated with an image coordinate system having a plane;

estimate a local orientation for each depth pixel in a subset of the depth pixels, the local orientation includes an in-plane orientation that is in the plane of the 2D image coordinate system, when the logic determines the local orientation based on the in-plane orientation the logic:
  determines a closest point between a test depth pixel and a reference line of an object in the depth map; and
  determines a rotation invariant angle for the test depth pixel based on an angle between a reference axis and a line between the test depth pixel and the closest point;

define a local 3D coordinate system for each of the depth pixels in the subset, each local 3D coordinate system is based on the local orientation of the corresponding depth pixel;

define a feature region relative to the local coordinate system for each of the depth pixels in the subset;

transform the feature region for each of the depth pixels in the subset from the local 3D coordinate system to the 2D image coordinate system; and identify the object in the depth map based on the transformed feature regions.

9. The system of claim 8, wherein the local orientation includes an out-of-plane orientation that is out of the plane of the 2D coordinate system, wherein when the logic estimates a local orientation the logic estimates an out-of-plane rotation, the out-of-plane rotation is defined by a surface normal to an object in the depth map at a test depth pixel.

10. The system of claim 9, wherein when the logic defines a local coordinate system for each of the depth pixels in the subset the logic defines a z-axis of the local coordinate system as being the surface normal.

11. The system of claim 8, wherein the local orientation includes an out-of-plane orientation that is out of the plane of the 2D coordinate system, wherein when the logic defines a local 3D coordinate system for each of the depth pixels in the subset the logic:
  determines a vector in 3D space from a test depth pixel to a point of interest;
  determines a surface normal to the object in the depth map; and
  establishes an x-axis that is the component of the vector in 3D space that is orthogonal to the surface normal.

12. The system of claim 11, wherein when the logic defines a local coordinate system for each of the depth pixels in the subset the logic establishes a y-axis as the cross product of a z-axis and the x-axis.

13. A computer readable storage device having instructions stored thereon which, when executed on a processor, cause the processor to:

access a depth map that includes an array of depth pixels, each depth pixel has a depth value, the depth map is associated with a 2D image coordinate system;

estimate a local orientation for each depth pixel in a subset of the depth pixels, the local orientation includes in-plane orientation that is in the plane of the 2D image coordinate system and an out-of-plane orientation that is out-of-the plane of the 2D image coordinate system, when the processor determines the local orientation based on the in-plane orientation the processor: determines a closest point between a test depth pixel and a reference line of an object in the depth map, and the processor determines a rotation invariant angle for the test depth pixel based on an angle between a reference axis and a line between the test depth pixel and the closest point;

determine a 3D model for the depth map, the model includes a plurality of 3D points that are based on the depth pixels, each of the points has a corresponding depth pixel;

define a local 3D coordinate system for each of the plurality of points, each local 3D coordinate system is based on a position and the local orientation of the corresponding depth pixel;

define feature test points relative to the local coordinate system for each of the points;

transform the feature test points from the local 3D coordinate system to the 2D image coordinate system for each of the feature test points; and identify the object in the depth map based on the transformed feature test points.

14. The computer readable storage device of claim 13, wherein the instructions that cause the processor to transform the feature test points cause the processor to rotate the feature test points using a rotation matrix $R=[\vec{r}_1, \vec{r}_2, \vec{r}_3]$, where $\vec{r}_3$ is a unitized surface normal to the object, $\vec{r}_1$ is the component of an in-plane rotation-variant vector that is orthogonal to the surface normal, and $\vec{r}_2$ is the cross product between $\vec{r}_3$ and $\vec{r}_1$.

15. The computer readable storage device of claim 13, wherein the out-of-plane rotation is defined by a surface normal to the object at the test depth pixel, the instructions that cause the processor to define a local coordinate system for each of the plurality of points cause the processor to define a z-axis of the local coordinate system as being the surface normal.

16. The computer readable storage device claim 13, wherein the instructions that cause the processor to define a local coordinate system for each of the plurality of points cause the processor to:
  determine a vector in 3D space from a first of the points to a point of interest;
  determine a surface normal to the object; and
  establish an x-axis that is the component of the vector in 3D space that is orthogonal to the surface normal.

17. The computer readable storage device of claim 16, wherein the instructions that cause the processor to define a local coordinate system for each of the plurality of points cause the processor to establish a y-axis as the cross product of a z-axis and the x-axis.

18. The method of claim 1, wherein the reference line of the object comprises an edge or a medial axis.

* * * * *